United States Patent
Kim et al.

(10) Patent No.: US 11,564,217 B2
(45) Date of Patent: Jan. 24, 2023

(54) METHOD AND APPARATUS FOR TRANSMITTING DOWNLINK CONTROL CHANNEL IN WIRELESS COMMUNICATION SYSTEM

(71) Applicant: Samsung Electronics Co., Ltd., Gyeonggi-do (KR)

(72) Inventors: Taehyoung Kim, Seoul (KR); Youngbum Kim, Seoul (KR); Youngwoo Kwak, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 35 days.

(21) Appl. No.: 16/611,758

(22) PCT Filed: May 8, 2018

(86) PCT No.: PCT/KR2018/005268
§ 371 (c)(1),
(2) Date: Nov. 7, 2019

(87) PCT Pub. No.: WO2018/208059
PCT Pub. Date: Nov. 15, 2018

(65) Prior Publication Data
US 2020/0260416 A1  Aug. 13, 2020

(30) Foreign Application Priority Data

May 8, 2017 (KR) .................. 10-2017-0057439
Jun. 23, 2017 (KR) .................. 10-2017-0079989

(51) Int. Cl.
*H04W 72/04* (2009.01)

(52) U.S. Cl.
CPC .................. *H04W 72/042* (2013.01)

(58) Field of Classification Search
CPC ... H04W 72/042; H04B 7/088; H04B 7/0695; H04L 1/1845; H04L 5/0053;
(Continued)

(56) References Cited

U.S. PATENT DOCUMENTS

| 10,440,739 B2 | 10/2019 | Liu et al. |
| 2012/0218968 A1 | 8/2012 | Kim et al. |

(Continued)

FOREIGN PATENT DOCUMENTS

| CN | 104796185 | 7/2015 |
| CN | 105530685 | 4/2016 |

(Continued)

OTHER PUBLICATIONS

Samsung, "Multi-beam Transmission for NR-PDCCH", R1-1707987, 3GPP TSG RAN WG1 Meeting #89, May 15-19, 2017, 7 pages.
(Continued)

*Primary Examiner* — John D Blanton
(74) *Attorney, Agent, or Firm* — The Farrell Law Firm, P.C.

(57) ABSTRACT

The present disclosure relates to a communication scheme for convergence of an IoT technology and a 5G communication system for supporting a higher data transmission rate beyond a 4G system, and a system therefor. The present disclosure may be applied to an intelligent service (for example, a smart home, a smart building, a smart city, a smart car or connected car, healthcare, digital education, retail business, a security and security related service, or the like) on the basis of a 5G communication technology and an IoT related technology. The present invention provides a method for more efficiently transmitting uplink control information and data in a mobile communication system (Continued)

which operates in an unlicensed band or a mobile communication system which requires a channel detection operation.

15 Claims, 24 Drawing Sheets

(58) Field of Classification Search
CPC ... H04L 5/0092; H04L 5/0094; H04L 5/0048; H04L 5/0007
See application file for complete search history.

(56) References Cited

U.S. PATENT DOCUMENTS

| | | | |
|---|---|---|---|
| 2014/0112220 | A1 | 4/2014 | Kwak |
| 2015/0156751 | A1 | 6/2015 | Seo |
| 2016/0338033 | A1 | 11/2016 | Xiao et al. |
| 2017/0047976 | A1 | 2/2017 | Noh et al. |
| 2019/0349915 | A1* | 11/2019 | Ahn ............... H04L 5/0091 |
| 2020/0076487 | A1* | 3/2020 | Liu ............... H04B 7/0408 |
| 2020/0119839 | A1* | 4/2020 | Jo ............... H04L 5/00 |
| 2020/0119869 | A1* | 4/2020 | Taherzadeh Boroujeni ............... H04B 7/0695 |
| 2020/0336193 | A1* | 10/2020 | Park ............... H04B 7/0695 |
| 2021/0036751 | A1 | 2/2021 | Nigam et al. |

FOREIGN PATENT DOCUMENTS

| | | |
|---|---|---|
| CN | 106385710 | 2/2017 |
| CN | 106576265 | 4/2017 |

OTHER PUBLICATIONS

Huawei et al., "Search Space Design Aspects", R1-1701640, 3GPP TSG RAN WG1 Meeting #88, Feb. 13-17, 2017, 5 pages.
ETRI: "Discussion on Configuration of Search Space and Coreset", R1-1708100, 3GPP TSG RAN WG1 #89, May 15-19, 2017, 3 pages.
European Search Report dated Mar. 26, 2020 issued in counterpart application No. 18799355.5-1205, 13 pages.
PGT/ISA/210 Search Report issued on PCT/KR2018/005268, pp. 5.
PCT/ISA/237 Written Opinion issued on PCT/KR2018/005268, pp. 6.
Intel Corporation, 3GPP TSG RAN WG1 Meeting #89, R1-1707378, Hangzhou, P.R. China, May 7, 2017, "PDCCH transmission schemes and multi-beam operation", pp. 5.
Guangdong OPPO Mobile Telecom, 3GPP TSG RAN WG1 meeting #89, R1-1707703, Hangzhou, PR China, May 6, 2017, "PDCCH CORESET configuration and UE procedure on NR-PDCCH", pp. 9.
ZTE, 3GPP TSG RAN WG1 Meeting #89, R1-1707160, Hangzhou, China, May 6, 2017, "Time domain definition for CORESET", pp. 5.
Samsung, 3GPP TSG RAN WG1 meeting #89, R1-1707930, Hangzhou, P.R. China, May 6, 2017, "Remaining system information delivery", pp. 6.
Huawei, HiSilicon, 3GPP TSG RAN WG1 Meeting #88bis, R1-1704202, Spokane, USA, Mar. 25, 2017, "Search space design consideration", pp. 6.
Intel Corporation, 3GPP TSG-RAN WG1 #87, R1-1611982, Reno, USA, Nov. 14-18, 2016, "Discussion on beam recovery in NR", pp. 5.
Ericsson, 3GPP TSG-RAN WG1 #88, R1-1702674, Athens, Greece, Feb. 13-17, 2017, "Beam management overview", pp. 6.
Samsung, 3GPP TSG RAN WG1 #87, R1-1612516, Reno, USA, Nov. 14-18, 2016, "Beam management for DL control channel", pp. 3.
Samsung, 3GPP TSG RAN WG1#8 8bis, R1-1705342, Spokane, USA, Apr. 3-7, 2017, "DL beam management details", pp. 5.
Chinese Office Action dated Dec. 21, 2021 issued in counterpart application No. 201880030712.4, 20 pages.
ZTE, ZTE Microelectronics, "Discussion on DL Beam Management" R1-1704398, 3GPP TSG RAN WG1 Meeting #88bis, Apr. 3-7, 2017, 12 pages.
Chinese Office Action dated May 19, 2022 issued in counterpart application No. 201880030712.4, 8 pages.

* cited by examiner

METHOD AND APPARATUS FOR TRANSMITTING DOWNLINK CONTROL CHANNEL IN WIRELESS COMMUNICATION SYSTEM

PRIORITY

This application is a National Phase Entry of PCT International Application No. PCT/KR2018/005268 which was filed on May 8, 2018, and claims priority to Korean Patent Application Nos. 10-2017-0057439 and 10-2017-0079989, which were filed on May 8, 2017 and Jun. 23, 2017, respectively, the content of each of which is incorporated herein by reference.

TECHNICAL FIELD

The disclosure relates to a wireless communication system, and more particularly to a method and an apparatus for transmitting a downlink control channel in a next-generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, unlike conventional LTE, the need for a method and an apparatus for more flexibly using time and frequency resources has appeared in 5G.

DISCLOSURE OF INVENTION

Technical Problem

An aspect of the disclosure is to provide a method and an apparatus for sharing resources between a downlink control channel and a downlink data channel in a 5G communication system.

Solution to Problem

In accordance with an aspect of the disclosure, an evolved NodeB (eNB) is provided. The eNB includes: a transceiver configured to transmit and receive a signal; and a controller configured to control the transceiver to transmit CORESET configuration information including at least one piece of beam information corresponding to at least one respective CORESET and transmit downlink control information (DCI) in each of the at least one CORESET based on the at least one piece of beam information included in the CORESET configuration information.

In accordance with another aspect of the disclosure, a method of controlling an evolved Node B (eNB) is provided. The method includes: transmitting CORESET configuration information including at least one piece of beam information corresponding to at least one respective CORESET; and transmitting downlink control information (DCI) in each of the at least one CORESET based on the at least one piece of beam information included in the CORESET configuration information.

In accordance with another aspect of the disclosure, a terminal is provided. The terminal includes: a transceiver configured to transmit and receive a signal; and a controller configured to receive CORESET configuration information including at least one piece of beam information corresponding to at least one respective CORESET and receive downlink control information (DCI) in each of the at least one CORESET based on the at least one piece of beam information included in the CORESET configuration information.

In accordance with another aspect of the disclosure, a method of controlling a terminal is provided. The method includes: receiving CORESET configuration information including at least one piece of beam information corresponding to at least one respective CORESET; and receiving downlink control information (DCI) in each of the at least one CORESET based on the at least one piece of beam information included in the CORESET configuration information.

Advantageous Effects of Invention

As described above, the disclosure provides a method and an apparatus for sharing resources between a downlink control channel and a downlink data channel in a 5G communication system, thereby more efficiently operating the 5G system.

MODE FOR THE INVENTION

Figure 1:
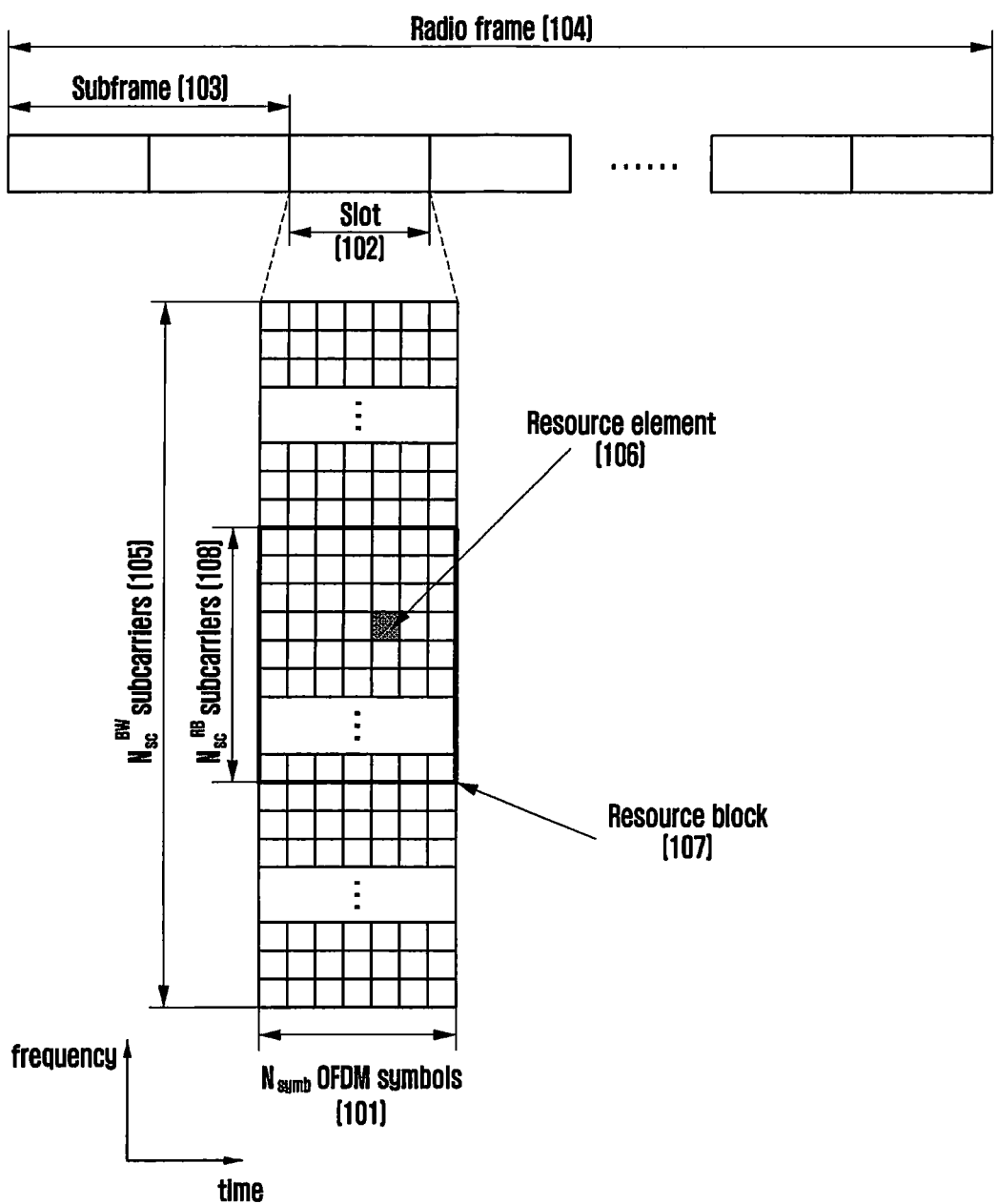
FIG. 1 illustrates the basic structure of time-frequency regions in LTE.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

In order to support the transmission of downlink and uplink transmission channels in a wireless communication system, downlink control information (DCI) related thereto is needed. In conventional LTE, DCI is transmitted through a physical downlink control channel (PDCCH), which is a separate physical channel through which downlink control information is transmitted. At this time, the PDCCH is transmitted in every subframe over the entire system band. One PDCCH may carry one DCI message. Since a plurality of terminals can be simultaneously scheduled in downlink and uplink, a plurality of PDCCH transmissions is simultaneously performed within respective cells. A cell-specific reference signal (CRS), which is a cell-common reference signal, is used as a reference signal (RS) for decoding of the PDCCH. The CRS is an always-on signal transmitted in every subframe over the entire band, and scrambling and resource mapping vary depending on a cell identity (ID). All terminals monitoring the PDCCH estimate a channel on the basis of the CRS and decode the PDCCH. In decoding of the PDCCH, the terminal performs blind decoding in a specific resource region defined as a search space. The search space of the PDCCH is defined as a set of resource candidates through which the PDCCH can be transmitted at various aggregation levels.

Unlike the conventional system, a 5G wireless communication system supports not only a service requiring a high transmission rate but also both a service having a very short transmission delay and a service requiring a high connection density. Such scenarios should be able to provide different transmission/reception schemes in one system and various services having transmission/reception parameters in order to meet the various requirements of users and services, and it is important to design the scenarios so as to avoid creating limitations by which the addition of services is limited by the current system from the aspect of forward compatibility. In 5G, it is critical to use time and frequency resources more flexibly than conventional LTE. Above all, securing flexibility is one of very important issues to design a control channel. For this reason, the downlink control channel may be transmitted through a specific subband without being transmitted over the entire system band in the 5G communication system. Time and frequency resources through which the downlink control channel is transmitted may be configured in the terminal.

In order to compensate for the very large path attenuation in a high-frequency band, for example, a band higher than or equal to 60 GHz, the 5G communication system may use a beamforming scheme having a narrow beam width using a plurality of antennas. As beams having a narrow beam width are used, a problem of blocking a beam link may occur due to a transmission environment between the terminal and an evolved NodeB (eNB), for example, the existence of obstacles or a change of direction of the terminal. The eNB and the terminal determine that the beam link is blocked and thus require an operation for reforming the link through appropriate beams. In order to solve the problem, transmission of a downlink control channel through a plurality of beams may be considered. Accordingly, the disclosure proposes a method of efficiently transmitting one downlink control channel through a plurality of beams and eNB and terminal operations related thereto. In the disclosure, the plurality of beams through which the downlink control channel is transmitted may be divided into a main beam group and a sub beam group. In each beam group, an independent control region (control resource set (CORE-SET) may be configured, the same control region may be repeated, or only one control region may be configured. The method of transmitting DCI by the eNB may vary depending on the method of configuring a control region, and accordingly, a blind decoding operation of the terminal and a beam-reforming request operation may vary.

A wireless communication system has developed into a broadband wireless communication system that provides a high-speed and high-quality packet data service, like the communication standards, for example, high-speed packet access (HSPA) of 3GPP, long-term evolution (LTE) or evolved universal terrestrial radio access (E-UTRA), LTE-advanced (LTE-A), high rate packet data (HRPD) of 3GPP2, ultra-mobile broadband (UMB), and 802.16e of IEEE, or the like, beyond the voice-based service provided in initial stages.

An LTE system, which is a representative example of the broadband wireless communication system, employs an orthogonal frequency division multiplexing (OFDM) scheme for a downlink (DL), and employs a single-carrier frequency-division multiple-access (SC-FDMA) scheme for an uplink (UL). The uplink is a radio link through which the terminal (a user equipment (UE) or a mobile station (MS)) transmits data or a control signal to the eNB (an eNodeB or a base station (BS)), and the downlink is a radio link through which the eNB transmits data or a control signal to the terminal. In the multiple access schemes as described above, time-frequency resources for carrying data or control information are allocated and operated in a manner that prevents overlapping of the resources, for example, to establish orthogonality, between users, so as to identify data or control information of each user.

A post-LTE communication system, that is, a 5G communication system, should be able to freely reflect the various requirements of a user and a service provider, and thus it is required to support a service which satisfies the various requirements. Services which are considered for the 5G communication system include enhanced mobile broadband (eMBB), massive machine-type communication (mMTC), and ultra-reliability low-latency communication (URLLC).

The eMBB aims to provide a data transmission rate that is improved so as to surpass the data transmission rate supported by LTE, LTE-A, or LTE-Pro. For example, in the 5G communication system, the eMBB should provide a peak downlink data rate of 20 Gbps and a peak uplink data rate of 10 Gbps from the viewpoint of one eNB. Further, the 5G communication system should provide not only the peak data rate but also an increased user-perceived data rate. In order to satisfy these requirements, improvement of various transmission/reception technologies, including a further improved multi-input multi-output (MIMO) transmission technology, is needed. Further, while the current LTE system uses transmission bandwidths from a bandwidth of 20 GHz to a maximum bandwidth of 20 MHz to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Also, in order to support an application service such as the Internet of Things (IoT), mMTC is considered in the 5G communication system. The mMTC is required to support access by massive numbers of UEs within a cell, improve coverage of the UE, increase a battery lifetime, and reduce the costs of the UE in order to efficiently provide IoT. IoT connects various sensors and devices to provide a communication function, and thus should support a large number of terminals (for example, 1,000,000 terminals/km$^2$) within a cell. Further, since the terminal supporting the mMTC is highly likely to be located in a shade area, such as a basement, which a cell cannot cover due to service characteristics, the mMTC requires wider coverage than other services provided by the 5G communication system. The terminal supporting the mMTC needs to be produced at low cost and it is difficult to frequently exchange a battery thereof, and thus a very long battery lifetime, for example, 10 to 15 years, is required.

Last, the URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds, and additionally require a packet error rate equal to or smaller than $10^{-5}$. Accordingly, for the service supporting URLLC, the 5G system should provide a transmit time interval (TTI) smaller than that of other services. Further, for the service supporting URLLC, in a 5G system, it is required to perform design so as to allocate wide resources in the frequency band in order to secure reliability of the communication link.

Three services of 5G, namely eMBB, URLLC, and mMTC, may be multiplexed and transmitted in one system. The services may use different transmission/reception schemes and parameters to satisfy the different requirements thereof.

Hereinafter, the frame structure of the LTE and LTE-A systems will be described in more detail with reference to drawings.

FIG. 1 illustrates the basic structure of time-frequency regions, which are radio resource regions where data or a control channel is transmitted in a downlink of the LTE system.

In FIG. 1, the horizontal axis indicates the time region, and the vertical axis indicates the frequency region. In the time region, the minimum transmission unit is an OFDM symbol. One slot 102 consists of $N_{symb}$ OFDM symbols 101, and one subframe 103 consists of two slots. The length of one slot is 0.5 ms, and the length of one subframe is 1.0 ms. A radio frame 104 is a time region unit consisting of 10 subframes. The minimum transmission unit in the frequency region is a subcarrier, and the entire system transmission bandwidth consists of a total of NM subcarriers 105. In the time-frequency regions, the basic resource unit is a resource element (RE) 106, which is expressed by an OFDM symbol index and a subcarrier index. A resource block (RB) 107 (or physical resource block (PRB)) is defined by $N_{symb}$ consecutive OFDM symbols 101 in the time region and $N_{RB}$ consecutive subcarriers 108 in the frequency region. Therefore, one RB 108 consists of $N_{symb} \times N_{RB}$ REs 106. Generally, the minimum transmission unit of data is the RB. In the LTE system, generally, $N_{symb}=7$ and NRB=12. $N_{BW}$ and $N_{RB}$ are proportional to a system transmission bandwidth.

Next, downlink control information (DCI) in the LTE and LTE-A systems will be described in more detail.

In the LTE system, scheduling information of downlink data or uplink data is transmitted from the base station to the UE through the DCI. The DCI may operate through the application of one of various predefined DCI formats depending on whether scheduling information is scheduling information of uplink data or downlink data, whether the DCI is compact DCI having small size control information, and whether spatial multiplexing using multiple antennas is applied, and the DCI is DCI for controlling power. For example, DCI format 1, which is downlink data scheduling information, may include the following control information.

Resource allocation type 0/1 flag: indicates whether a resource allocation type is type 0 or type 1. Type 0 applies a bitmap scheme and allocates resources in units of resource block groups (RBGs). In the LTE system, a basic scheduling unit is a resource block (RB), expressed by resources in the time and frequency regions, and an RBG includes a plurality of RBs and is used as a basic scheduling unit in the type 0 scheme. Type 1 allows allocation of a predetermined RB in an RBG.

Resource block assignment: indicates RBs allocated to data transmission. An expressed resource is determined according to the system bandwidth and resource allocation scheme.

Modulation and coding scheme (MCS): indicates a modulation scheme used for data transmission and the size of a transport block, which is the data to be transmitted.

HARQ process number: indicates a process number of HARQ.

New data indicator: indicates HARQ initial transmission or HARQ retransmission.

Redundancy version: indicates a redundancy version of HARQ.

Transmit power control (TPC) command for physical uplink control channel (PUCCH): indicates a transmission power control command for a PUCCH, which is an uplink control channel.

The DCI is transmitted through a PDCCH or an enhanced PDCCH (EPDCCH), which is a downlink physical control channel, via a channel-coding and modulation process.

A cyclic redundancy check (CRC) is added to a DCI message payload and is scrambled with a radio network temporary identifier (RNTI) corresponding to the identity of the terminal. Depending on the purpose of the DCI message, for example, terminal (UE)-specific data transmission, a power control command, or a random access response, different RNTIs are used. The RNTI is not explicitly transmitted, but is transmitted in the state of being included in a CRC calculation process. If the DCI message transmitted through the PDCCH is received, the UE may identify the CRC through the allocated RNTI, and may recognize that the corresponding message is transmitted to the UE when the CRC is determined to be correct on the basis of the CRC identification result.

Figure 2:
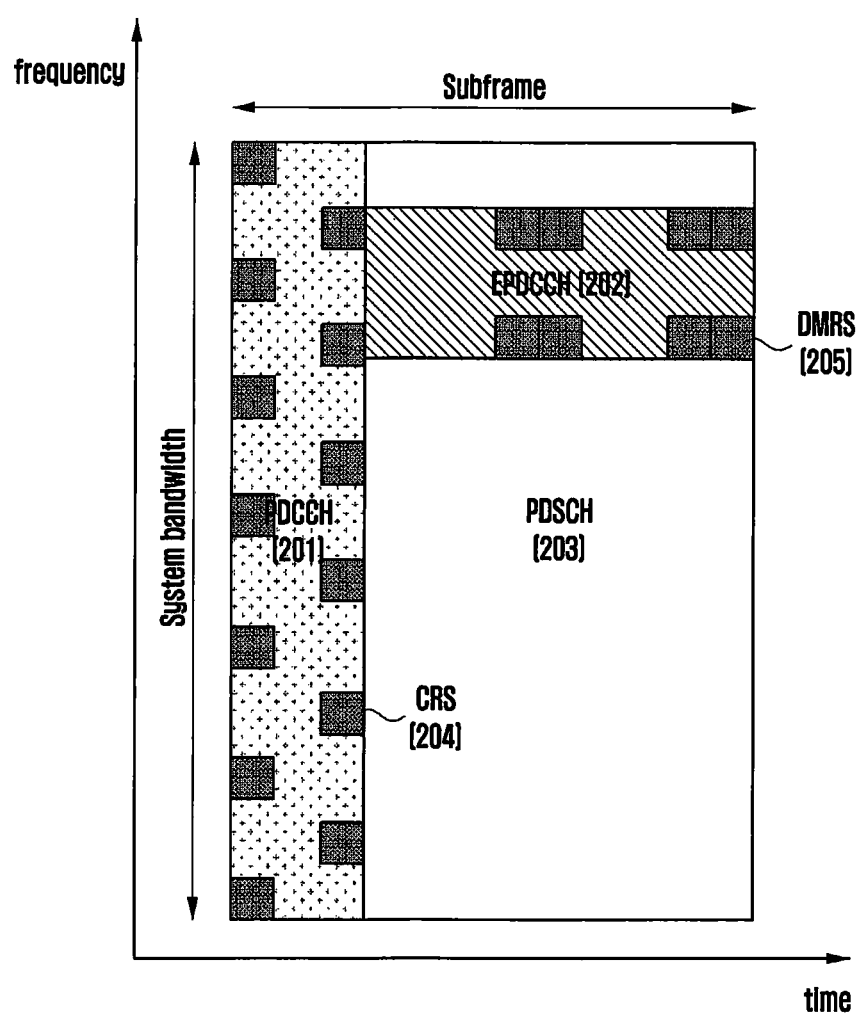
FIG. 2 illustrates a PDCCH and an EPDCCH, which are downlink control channels in LTE.

FIG. 2 illustrates a PDCCH 201 and an enhanced PDCCH (EPDCCH) 202, which are downlink physical channels for transmitting DCI in LTE.

Referring to FIG. 2, the PDCCH 201 is multiplexed with a PDSCH 203, which is a data transmission channel, on the time axis and is transmitted over the entire system bandwidth. The region of the PDCCH 201 is expressed by the number of OFDM symbols, and is indicated to the terminal through a control format indicator (CFI) transmitted through a physical control format indicator channel (PCFICH). By allocating the PDCCH 201 to OFDM symbols on the front part of the subframe, the terminal may decode downlink scheduling allocation as soon as possible, and thus a decoding delay for a downlink shared channel (DL-SCH), that is, a total downlink transmission delay, may be reduced. One PDCCH carries one DCI message, and a plurality of terminals may be simultaneously scheduled on the downlink and the uplink, so that a plurality of PDCCH transmissions is simultaneously performed within respective cells. A CRS 204 is used as a reference signal for decoding the PDCCH 201. The CRS 204 is transmitted in every subframe over the entire band, and scrambling and resource mapping vary depending on a cell identity (ID). Since the CRS 204 is a reference signal used in common by all UEs, UE-specific beamforming cannot be used. Accordingly, a multi-antenna transmission scheme of the PDCCH in LTE is limited to open-loop transmission diversity. The number of ports of the CRS is implicitly made known to the terminal from decoding of a physical broadcast channel (PBCH).

Resource allocation of the PDCCH 201 is based on a control-channel element (CCE), and one CCE consists of 9 resource element groups (REGs), that is, a total of 36 resource elements (REs). The number of CCEs required for a particular PDCCH 201 may be 1, 2, 4, or 8, which varies depending on the channel-coding rate of the DCI message payload. As described above, different numbers of CCEs may be used to implement link adaptation of the PDCCH 201. The UE is required to detect a signal without being aware of information on the PDCCH 201, so a search space indicating a set of CCEs is defined for blind decoding in LTE. The search space includes a plurality of sets at an aggregation level (AL) of each CCE, which is not explicitly signaled but is implicitly defined through a function using a UE identity and a subframe number. In each subframe, the UE performs decoding on the PDCCH 201 with respect to all resource candidates that can be configured by CCEs within the set search space and processes declared information valid for the corresponding terminal through identification of the CRC.

The search space is classified into a terminal-specific search space and a common search space. Terminals in a predetermined group or all UEs may search for a common search space of the PDCCH 2901 in order to receive cell-common control information such as dynamic scheduling of system information or paging messages. For example, scheduling allocation information of the DL-SCH for transmission of system information block (SIB)-1 including service provider information of the cell may be received by searching for the common search space of the PDCCH 201.

Referring to FIG. 2, the EPDCCH 202 is multiplexed and transmitted on the frequency with the PDSCH 203. The eNB may appropriately allocate resources of the EPDCCH 202 and the PDSCH 203 through scheduling and accordingly effectively support the coexistence with transmission of data for the existing LTE UE. However, the EPDCCH 202 is transmitted while being allocated to the entirety of one subframe on the time axis, so that there is a problem in terms of a transmission delay time. A plurality of EPDCCHs 202 constitutes a set of EPDCCHs 202, and allocation of the set of EPDCCHs 202 is performed in units of physical resource block (PRB) pairs. Location information of the set of EPDCCHs is configured in a terminal-specific manner and is signaled through remote radio control (RRC). Up to two sets of EPDCCHs 202 may be configured in each UE, and one set of EPDCCHs 202 may be simultaneously multiplexed and configured in different UEs.

Resource allocation of the EPDCCH 202 is based on enhanced CCEs (ECCEs), and one ECCE consists of 4 or 8 enhanced REGs (EREGs), and the number of EREGs per ECCE varies depending on a CP length and subframe configuration information. One EREG consists of 9 REs, and accordingly 16 EREGs may exist per RPB pair. EPDCCH transmission types are classified into localized and distributed transmission types according to the RE mapping scheme of EREGs. The aggregation level of the ECCEs may be 1, 2, 4, 8, 16, or 32, which is determined by a CP length, a subframe configuration, an EPDCCH format, and a transmission scheme.

The EPDCCH 202 supports only a UE-specific search space. Accordingly, the terminal that desires to receive a system message should necessarily search for a, common search space on the existing PDCCH 201.

In the EPDCCH 202, a demodulation reference signal (DMRS) 205 is used as a reference signal for decoding. Accordingly, precoding for the EPDCCH 202 may be configured by the BS, and may use UE-specific beamforming. Although UEs are not aware which kind of precoding is used through the DMRS 205, the UEs may perform decoding for the EPDCCH 202. In the EPDCCH 202, the same pattern as the DMRS of the PDSCH 203 is used. However, unlike the PDSCH 203, the DMRS 202 of the EPDCCH 205 may support transmission using a maximum of four antenna ports. The DMRS 205 is transmitted only in the corresponding PRB through which the EPDCCH is transmitted.

The port configuration information of the DMRS 205 varies depending on the transmission scheme of the EPDCCH 202. In a localized transmission scheme, an antenna port corresponding to the ECCE to which the EPDCCH 202 is mapped is selected on the basis of a terminal ID. If different terminals share the same ECCE, that is, if multiuser MIMO transmission is used, the DMRS antenna port may be allocated to each UE. Alternatively, transmission may be performed while sharing the DMRS 205. In this case, the transmission may be identified by a DMRS 205 scrambling sequence configured through higher-layer signaling. In the distributed transmission scheme, up to two antenna ports of the DMRS 205 are supported, and a diversity scheme in a precoder cycling type is supported. All REs transmitted within one PRB pair may share the DMRS 205.

The downlink control channel transmission schemes in LTE and LTE-A and the RS for decoding the downlink control channel have been described above.

Hereinafter, the downlink control channel in the 5G communication system will be described in more detail with reference to the accompanying drawings.

Figure 3:
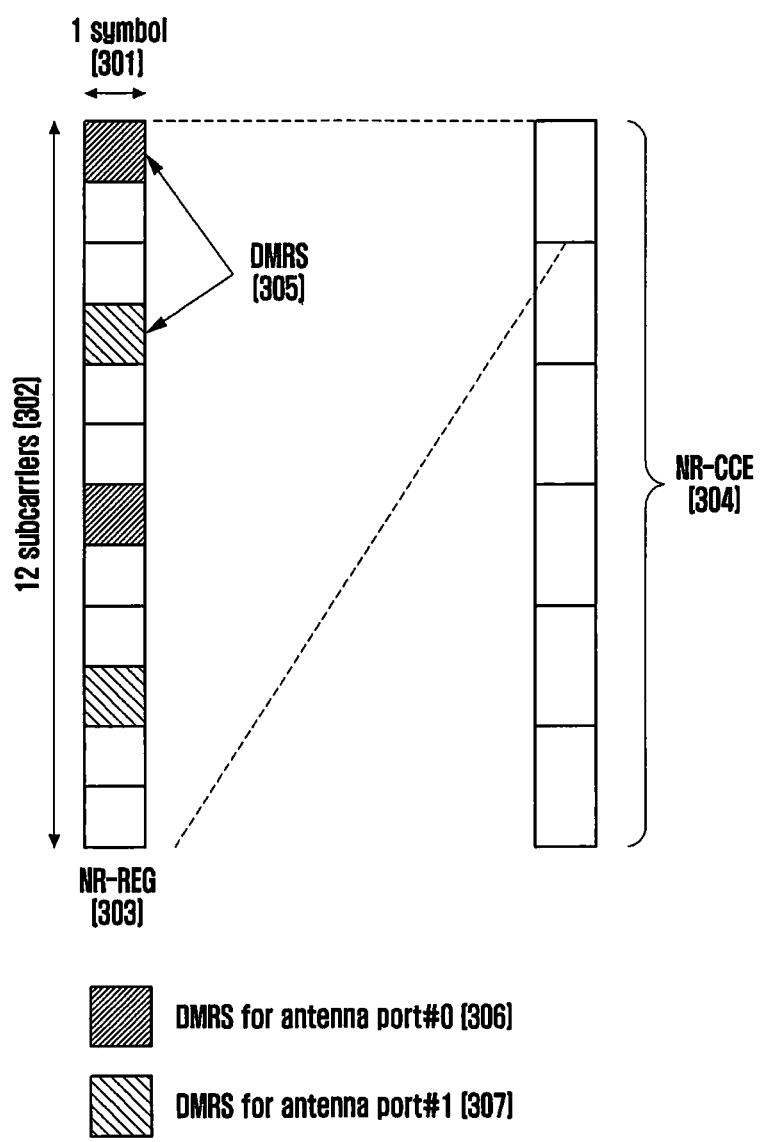
FIG. 3 illustrates a 5G downlink control channel.

FIG. 3 illustrates an example of the basic unit of time and frequency resources for constituting the downlink control channel that can be used in 5G. Referring to FIG. 3, the basic unit of the time and frequency resources constituting the control channel (named an REG or a new-radio (NR)-REG, and hereinafter, referred to as an NR-REG 303 in the disclosure) consists of 1 OFDM symbol 301 on the time axis and 12 subcarriers 302, for example, 1 RB, on the frequency axis. In the configuration of the basic unit of the control channel, a data channel and a control channel can be multiplexed on the time axis within one subframe on the assumption that the basic unit on the time axis is 1 OFDM symbol 301. It is easy to satisfy the delay time requirements through a decrease in processing time of the user by placing the control channel ahead of the data channel. It is possible to more efficiently perform frequency multiplexing between the control channel and the data channel by configuring the basic unit on the frequency axis of the control channel as 1 RB 302.

Various sizes of control channel regions can be configured by concatenating the NR-REGs 303 illustrated in FIG. 3. For example, if a basic unit for allocation of the downlink control channel in 5G is 1 NR-CCE 304, one NR-CCE 304 may consist of a plurality of NR-REGs 303. For example, the NR-REG 303 illustrated in FIG. 3 may consist of 12 REs, and if 1 NR-CCE 304 consists of 4 NR-REGs 303, 1

NR-CCE 304 may consist of 48 REs. If a downlink control region is configured, the corresponding region may include a plurality of NR-CCEs 304, and a particular downlink control channel may be mapped to one or a plurality of NR-CCEs 304 according to an aggregation level (AL) within the control region, and may then be transmitted. NR-CCEs 304 within the control region may be distinguished by numbers, and the numbers may be assigned according to a logical mapping scheme.

The basic unit of the downlink control channel illustrated in FIG. 3, that is, the NR-REG 303, may include all REs to which the DCI is mapped and the region to which a DMRS 305, which is a reference signal for decoding the REs, is mapped. At this time, the DMRS 305 may be efficiently transmitted in consideration of overhead due to RS allocation. For example, if the downlink control channel is transmitted using a plurality of OFDM symbols, the DMRS 305 may be transmitted only through a first OFDM symbol. The DMRS 305 may be mapped and transmitted in consideration of the number of antenna ports used for transmitting the downlink control channel. FIG. 3 illustrates an example in which two antenna ports are used. At this time, a DMRS 306 transmitted for antenna port #0 and a DMRS 307 transmitted for antenna port #1 may exist. The DMRSs for different antenna ports may be multiplexed in various ways. FIG. 3 illustrates an example in which DMRSs corresponding to different antenna ports are orthogonal and transmitted in different REs. As described above, the DMRSs may be transmitted in an FDM manner or a CDM manner. Further, various DMRS patterns may exist and the number of antenna ports may be related thereto. Hereinafter, it is assumed that two antenna ports are used for the sake of description of the disclosure. The same principle of the disclosure may be applied to two or more antenna ports.

Figure 4:
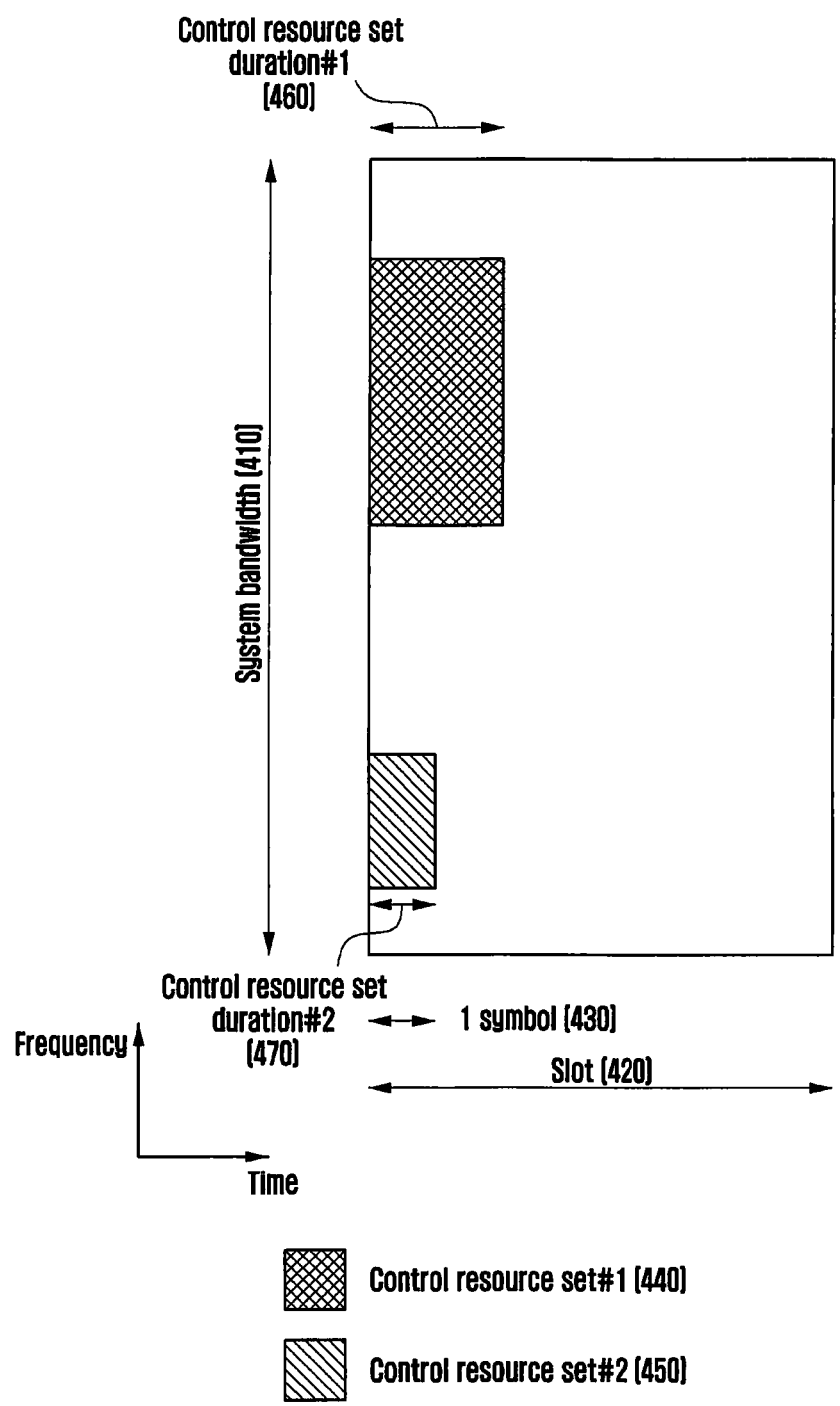
FIG. 4 illustrates a method of allocating a control region for the 5G downlink control channel.

FIG. 4 illustrates an example of a control region (control resource set (CORESET)) in which a downlink control channel is transmitted in a 5G wireless communication system. FIG. 4 illustrates an example in which two control regions (control region #1 440 and control region #2 450) are configured within a system bandwidth 410 on the frequency axis and 1 slot 420 on the time axis (it is assumed that 1 slot consists of 7 OFDM symbols in the example of FIG. 4). The control regions 440 and 450 may be configured as specific subbands within the entire system bandwidth 410 on the frequency axis. The control regions may be configured by one OFDM symbol 430 or a plurality of OFDM symbols on the time axis, which may be defined as control region lengths 460 and 470 (control resource set durations). In the example of FIG. 4, control region #1 440 is configured as the control region length of two symbols and control region #2 450 is configured as the control region length of one symbol.

In 5G, a plurality of control regions may be configured in one system from the viewpoint of the eNB. Further, a plurality of control regions may be configured for one terminal from the viewpoint of the terminal. In addition, some of the configured control regions within the system may be configured in the terminal. Accordingly, the terminal may not know whether a particular control region exists within the system. In a detailed example; two control regions including control region #1 440 and control region #2 450 are configured within the system of FIG. 4, and control region #1 440 may be configured for terminal #1 and control region #1 440 and control region #2 450 may be configured for terminal #2. If there is no additional indicator, terminal #1 may not be aware of whether control region #2 450 exists.

The control region in 5G may be configured as a common control region, a terminal (UE)-group common region, or a terminal (UE)-specific region. The control region may be configured to each terminal through terminal-specific signaling, terminal-group common signaling, or RRC signaling. Configuring the control region to the terminal means providing information such as the location of the control region, a subband, resource allocation of the control region, and the control region length.

Next, configuration information of the control region for the downlink control channel considered in 5G will be described in more detail.

The control region of the downlink control channel may be configured in each terminal through higher-layer signaling, for example, RRC signaling. The control region configuration information may include the following information.

Configuration information 1. Frequency axis RB allocation information

Configuration information 2. Time axis control region length (the number of OFDM symbols configured as the control region)

Configuration information 3. Resource-mapping scheme (time-first mapping or frequency-first mapping)

Configuration information 4. Transmission mode (localized transmission scheme or distributed transmission scheme)

Configuration information 5. Search space type (common search space, terminal-group search space, and terminal-specific search space)

Configuration information 6. Monitoring occasion (monitoring period/interval and monitoring symbol location within a slot)

Configuration information 7. DMRS configuration information (DMRS structure and the number of DMRS ports)

Configuration information 8. REG bundling size

Various other information required for transmitting the downlink control channel may be configured in the terminal as well as the above-listed configuration information.

In the above, the structure and the configuration method of the downlink control channel in the 5G communication system have been described in detail.

Hereinafter, a transmission/reception method using a plurality of beams in the 5G communication system will be described in detail with reference to the accompanying drawings.

Figure 5:
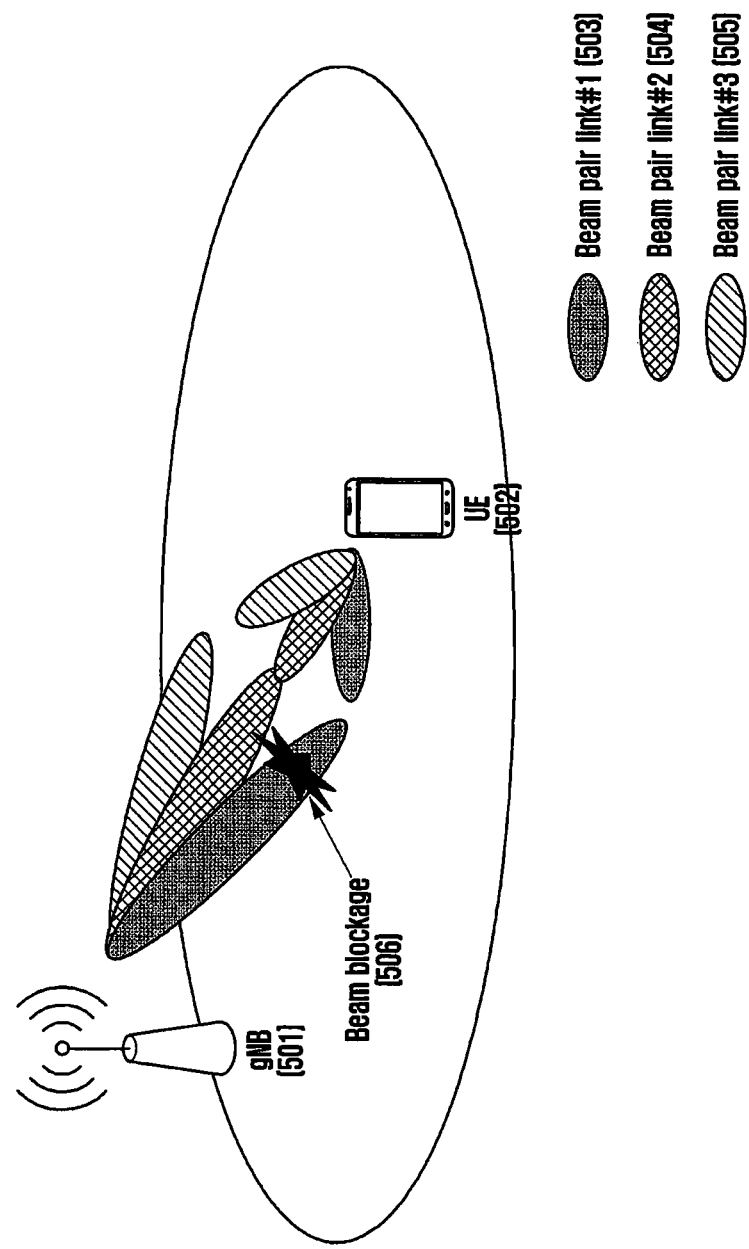
FIG. 5 illustrates a transmission/reception method using multiple beams in a 5G communication system.

FIG. 5 illustrates an example of an eNB and a terminal that perform communication through a plurality of beams in the 5G communication system. In the example of FIG. 5, one gNB 501 and one UE 502 are illustrated, and a total of three beam pair links (BPLs), for example, beam pair link #1 503, beam pair link #2 504, and beam pair link #3 505, are formed between the gNB 501 and the UE 502. The beam pair link is a pair of a transmission beam and a reception beam formed through a beam-forming process (for example, beam management) between the gNB 501 and the UE 502. For example, if the gNB 501 may form a total of N transmission beams and the UE 502 may form a total of M reception beams, a total of M·N transmission and reception beam pair links may exist. The gNB 501 and the UE 502 may train the transmission and reception beam pair links through a predefined procedure (for example, a CSI-RS procedure (channel state information-reference signal process)), and the UE 502 may transmit feedback of information on a specific preferred beam pair link to the gNB 503. The gNB 501 may determine the beam pair link through which transmission and reception to and from the corresponding UE 502 is performed on the basis of the fed back beam information. FIG. 5 assumes a condition in which the gNB 501 and the UE 502 perform transmission and reception through one or a plurality of beam pair link #1 503, beam pair link #2 504, and beam pair link #3 505 by way of example.

In FIG. 5, if the gNB 501 and the UE 502 perform transmission and reception through beam pair link #1 503, temporary blocking 506 may be generated in beam pair link #1 503 for various reasons. For example, the directions of beams may be changed and the directions of specific transmission and reception beams may be mismatched for several reasons, such as blocking of beam pair link #1 503 by unexpected obstacles or mobility or rotation of the UE 502. If a blockage 506 is generated in beam pair link #1 503 between the gNB 501 and the UE 502, the gNB 501 and the UE 502 may continuously communicate with each other by changing transmission/reception beams to another beam pair link, for example, beam pair link #2 504 or beam pair link #3 505, through a beam recovery process.

At this time, for the beam recovery process, the gNB 501 or the UE 502 is aware of the generation of the blockage in the currently used beam pair link, and various control signals for changing beams should be successfully transmitted and received. Accordingly, the downlink control channel should have a characteristic robustness to beam blockage, and to this end, transmission of the downlink control channel using a plurality of beam pair links should be considered. For example, in FIG. 5, the downlink control channel may be transmitted through two beam pair links, such as beam pair link #1 503 and beam pair link #2 504. At this time, even though the beam blockage 506 is generated in beam pair link #1 503 as illustrated in FIG. 5, the downlink control channel can be still transmitted and received through beam pair link #2 504. Accordingly, the gNB 501 and the UE 502 may recognize the blockage 506 of beam pair link #1 503, perform communication through beam pair link #2 504 during the beam recovery process, and additionally form another beam pair link, for example, beam pair link #3 505, through the beam recovery process. As a result, if the blockage 506' is generated in beam pair link #1 503, the gNB 501 and the UE 502 communicating through beam pair link #1 503 and beam pair link #2 504 may perform communication again through beam pair link #2 504 and beam pair link #3 505 through the beam recovery process.

As described above, in order to compensate for very large path attenuation in a high-frequency band, for example, a band higher than or equal to 6 GHz, the 5G communication system may use a beamforming scheme having a narrow beam width using a plurality of antennas. Because beams having a narrow beam width are used, a problem of blocking a beam link may occur due to a transmission environment between the terminal and an evolved NodeB (eNB), for example, the existence of obstacles or a change in the direction of the terminal. The eNB and the terminal determine that the beam link is blocked and thus require an operation for reforming the link through appropriate beams. In order to solve this problem, transmission of a downlink control channel through a plurality of beams may be considered.

Accordingly, the disclosure proposes a method of efficiently transmitting one downlink control channel through a plurality of beam pair links and eNB and terminal operations related thereto. The disclosure first proposes a beam pair link configuration method required for transmitting the downlink control channel through a plurality of beam pair links. The number of beam pair links for transmitting the downlink control channel may be plural, or one or a plurality of beam pair links may be grouped and configured as one or a plurality of beam pair groups. Each beam group is characterized by configuration of different downlink control regions depending on the transmission purpose. The disclosure also proposes a method of configuring a control region in which the downlink control channel for a plurality of beam pair links or beam pair groups is transmitted. In each beam group, independent control regions may be configured, the same control region may be repeated, or only one control region may be configured. The method of transmitting DCI by the eNB may vary depending on the method of configuring a control region, and accordingly, a blind decoding operation of the terminal and a beam-reforming request operation may vary.

Hereinafter, exemplary embodiments of the disclosure will be described in detail with reference to the accompanying drawings. It should be noted that the same elements will be designated by the same reference numerals even when they are shown in different drawings. Further, a detailed description of known functions and configurations which may make the subject matter of the disclosure unclear will be omitted.

Further, although the following detailed description of embodiments of the disclosure will be directed to the LTE and 5G systems, it will be understood by those skilled in the art that the main gist of the disclosure may also be applied to any other communication system having similar technical backgrounds and channel formats, with a slight modification, without substantially departing from the scope of the disclosure.

Embodiment 1

Figure 6:
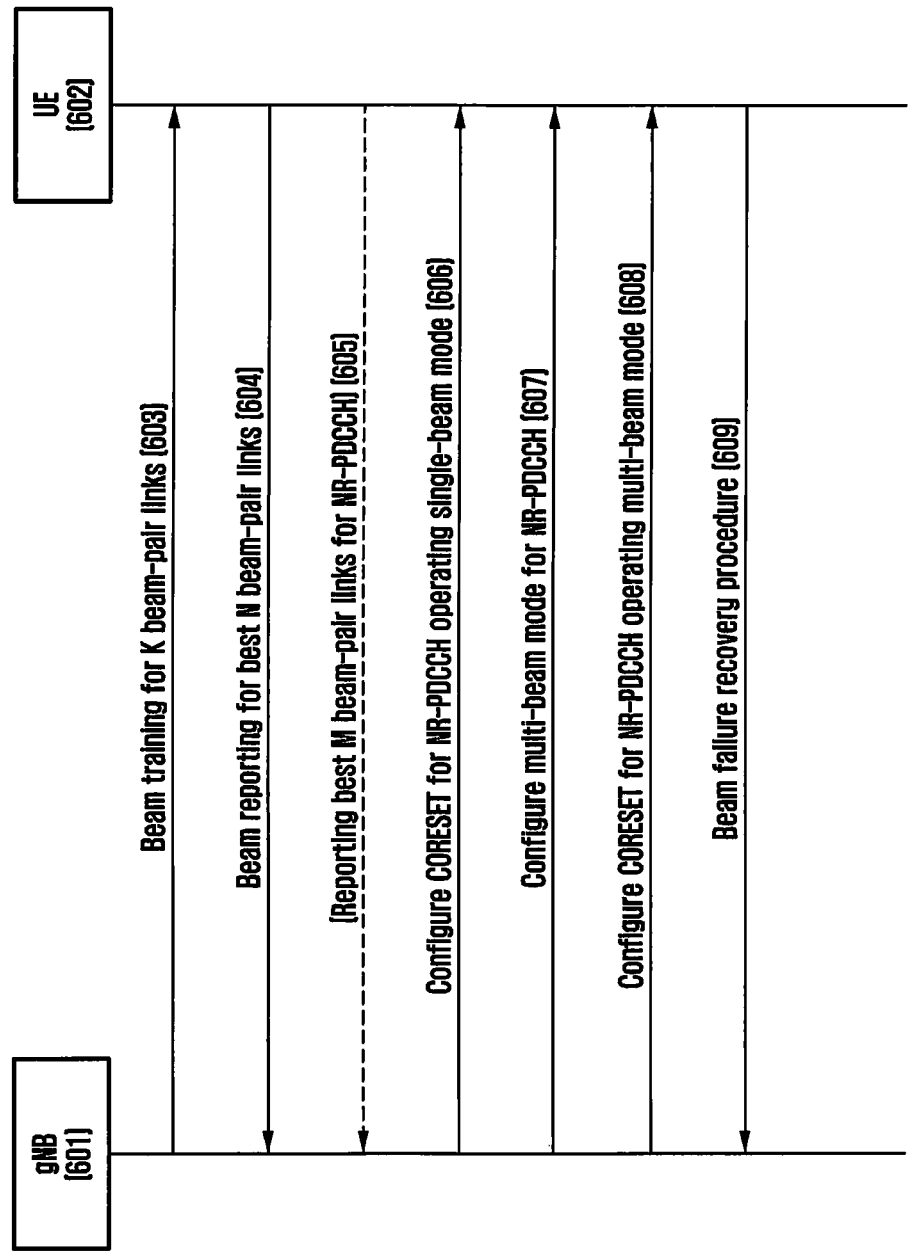
FIG. 6 illustrates embodiment 1 of the disclosure.

FIG. 6 illustrates eNB and terminal operations for forming a beam pair link and configuring a multi-beam communication mode for a control channel according to a first embodiment of the disclosure in a 5G communication system using a plurality of beams. The multi-beam communication mode is a communication mode in which transmission and reception are performed using a plurality of beam pair links.

According to the first embodiment of the disclosure illustrated in FIG. 6, a gNB 601 may first perform beam training on a plurality of beam pair links (for example, a total of K beam pair links) in step 603. For the beam-training process 603, the gNB 601 may transmit a reference signal, for example, a CSI-RS to which a specific transmission beam is beamformed, to the UE 602. Subsequently, the UE 602 may measure channel information (for example, received signal reference power (RSRP)) for a total of K beam pair links and, among them, provide feedback of information on one or a plurality of most preferred beam pair links (for example, N beam pair links) to the gNB 601 in step 604.

At this time, in order to perform multi-beam transmission for the downlink control channel according to the disclosure, the UE may additionally report information on one or a plurality of beam pair links for the downlink control channel to the gNB 601 in step 606. Specifically, for example, the UE 602 may report information (for example, beam pair link index information or corresponding channel state information) on beam pair link #1, which is the preferred beam pair link, in step 604, and may additionally report information on beam pair link #2 in step 605, and the gNB may transmit the downlink control channel through beam pair link #1 and beam pair link #2 in the multi-beam communication mode.

Subsequently, the gNB 601 may configure a control region (control resource set (CORESET) for transmitting the downlink control channel to the UE 602 in a single-beam communication mode. The single-beam communication mode is a method of performing transmission and reception between the gNB and the UE through one beam. Step 606 is based on the assumption that transmission and reception of the downlink control channel are basically performed in the single-beam communication mode. Accordingly, if transmission and reception of the downlink control channel are performed in the multi-beam mode by default, step 606 may be omitted and steps 607 and 608 may be directly applied. More generally, it is assumed that a communication mode using N beams (N=1, 2, 3, . . . ) is operated by default. It is assumed that the basic system operation is performed in the single-beam communication mode for the downlink control channel (for example, communication mode based on N=1) and that the multi-beam communication mode (or multi-beam communication mode using M beam pair links) may be configured in the UE by the gNB in the disclosure.

Subsequently, the gNB 601 may configure the multi-beam communication mode for the downlink control channel in the UE 602 in step 607. Simultaneously, the gNB 601 may transmit configuration information for a control region of the downlink control channel to the UE 602 in consideration of the multi-beam communication mode in step 608. After steps 607 and 608, the gNB 601 and the UE 602 may use a plurality of beam pair links in transmission and reception of the downlink control channel, and accordingly may effectively handle blocking of the aforementioned beam pair link. If a specific beam pair link between the gNB 601 and the UE 602 is blocked, a beam recovery procedure (beam failure recovery process) may be performed therefor in step 609. The beam recovery procedure refers to a complete series of processes for discovering a blocked beam pair link and forming a new beam pair link for recovery thereof.

Hereinafter, a more detailed embodiment of the method of configuring the multi-beam mode in step 607 will be described.

Embodiment 1-1

When the gNB 601 configures the multi-beam transmission mode for the downlink control channel in the UE 602 in step 607 of FIG. 6, the gNB 601 may include the following information as configuration information.

Configuration information 1. The number of beam pair links used for transmission The gNB 601 may configure the number of beam pair links, through which the downlink control channel is transmitted, in the UE 602. For example, the downlink control channel may be transmitted using M beam pair links among the N preferred beam pair links reported in step 604. Accordingly, the gNB 601 may transmit the corresponding configuration information to the UE 602.

Configuration information 2. Information of beam pair links used for transmission The gNB 601 may inform the UE 602 of information on beam pair links through which the downlink control channel is transmitted. The information on the beam pair links may be, for example, indexes of the beam pair links. For example, if the gNB 601 receives a report on {BPL #1, BPL #2, BPL #3, BPL #4, BPL #5, BPL #6} as information on 6 (=N) preferred beam pair link indexes from the UE 602 in step 604, the gNB 601 may inform the UE 602 of information indicating that only 3 (=M) beam pair links, for example, {BPL #1, BPL #3, BPL #5} are to be used for transmission of the downlink control channel.

Configuration information 3. Beam group information.

The gNB 601 may group one or a plurality of beam pair links and inform the UE 602 of information on the beam group. The beam group may include one or a plurality of beam pair links. In a detailed example, among beam pair links {BPL #1, BPL #3, BPL #5} to be used for downlink transmission, the gNB 601 may group a beam pair link {BPL #1} as a first beam pair group and beam pair links {BPL #3, BPL #5} as a second beam pair group, and inform the UE 602 of the configuration information. The grouping of the beam pair links may be performed for a specific purpose. For example, the first beam pair group may include a main beam pair link. The second beam pair group may include a sub beam pair link. The main beam pair link may be defined as a basic beam pair link through which the gNB and the UE perform transmission and reception. The sub beam pair link may be defined as an auxiliary beam pair link used to prepare for the case in which the main beam pair link is blocked. In another example, the beam group may be configured on the basis of a UE group. For example, in the case of the downlink control channel used for a UE-group-specific purpose, beam pair links of respective UEs may be grouped to form a beam group. The gNB 601 may configure beam group information in the UE 602. At this time, the gNB 601 may differently configure the control region for the downlink control channel on the basis of the beam group information. A detailed embodiment thereof will be described with reference to embodiment 3 and embodiment 3-1 below. If the number of beam pair links belonging to the beam group is one under the determination of the gNB, the beam group may be configured the same as the beam pair link. In this case, the configuration of the beam group may be omitted. Accordingly, in the following description of the disclosure, there is no difference between the beam pair link and the beam group.

Configuration information 4. Transmitted information on beam pair link (or beam group)

In transmission of the downlink control channel using the multi-beam pair link (hereinafter, referred to as the beam group), the gNB 601 may configure how to use each beam pair link in the UE 602. For example, the gNB 610 may configure which OFDM symbol(s) are used for each beam pair link in one slot and what periodicity is used for transmission. The UE 602 may determine the direction of a reception beam of the UE 602 as necessary according to the corresponding configuration. If the UE 602 uses an omnidirectional beam and thus does not need to change the reception beam in consideration of the transmission beam of the gNB 602, the information may be omitted.

The gNB and UE procedures for the method of configuring the multi-beam transmission mode of the downlink control channel have been described with reference to embodiment 1 according to the disclosure.

Hereinafter, a method of configuring the control region for the downlink control channel using the multi-beam transmission mode proposed by the disclosure will be described through various embodiments.

Embodiment 2

Figure 7:
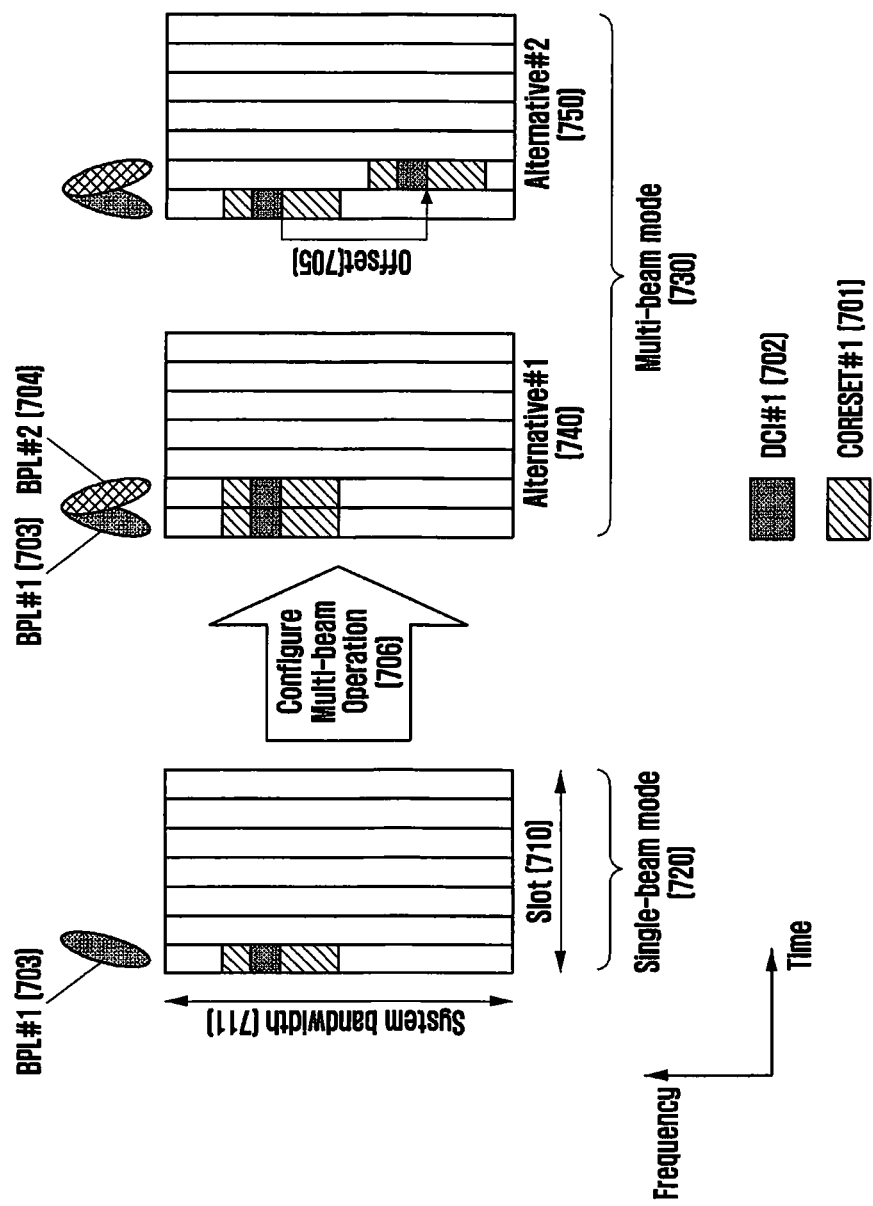
FIG. 7 illustrates embodiment 2 of the disclosure.

FIG. 7 illustrates a method of configuring the control region for the downlink control channel according to embodiment 2 of the disclosure.

FIG. 7 shows an example in which a system bandwidth 711 on the frequency axis and a control region 701 (CORE-SET #1 in FIG. 7) for one downlink control channel within one slot on the time axis are configured at specific time/frequency locations and DCI 702 (DCI #1 in FIG. 7) is transmitted at a specific location in the control region 701. It is assumed that the downlink control channel is transmitted and received through a specific beam pair link, for example, beam pair link #1 703, in a single-beam mode. Through a process such as step 607 described in embodiment 1, configuration from the single-beam mode 720 for the downlink control channel to a multi-beam mode 730 for the downlink control channel can be performed as indicated by reference numeral 706. More generally, a change from a first communication mode (for example, a communication mode using N beam pair links) to a second communication mode (for example, M beam pair links) may be considered. Hereinafter, in the description of embodiments of the disclosure, it is assumed that the first communication mode is a single-beam mode based on N=1 and that the second communication mode is a multi-beam mode based on M=2 for convenience of description, and it is considered that a change from the single-beam mode to the multi-beam mode is configured as indicated by reference numeral 706.

The gNB may configure the multi-beam mode 730 for the downlink control channel in the UE as indicated by reference numeral 706, and it is assumed that the downlink control channel is transmitted using beam pair link #1 703 and beam pair link #2 704 in FIG. 7. The configuration 706 of the multi-beam mode 730 may be made in the UE by the gNB on the basis of the configuration information described in connection with embodiment 1-1. If the gNB additionally configures beam group information (corresponding to configuration information 3 in embodiment 1-1), each beam pair link of FIG. 7 may be equally interpreted as a beam group.

Simultaneously with the configuration of the multi-beam mode 730, the gNB may additionally configure the control region 701 for the downlink control channel transmitted through added or changed beam pair links. At this time, in embodiment 2 of the disclosure, the control region 701 used in the single-beam mode 720 may be repeatedly used in the multi-beam mode 730. In a more detailed example, if the configuration is changed from the single-beam mode 720 using beam pair link #1 703 for transmission/reception of the downlink control channel to the multi-beam mode 730 using beam pair link #1 703 and beam pair link #2 704 therefor, the control region 701 for beam pair link #2 704 newly added in the multi-beam mode 730 may be configured to be the same as the control region 701 for beam pair link #1 703 as indicated by reference numeral 740 (alternative #1). Alternatively, the control region 701 for beam pair link #2 704 is configured to be the same as the control region 701 for beam pair link #1 703, but a frequency axis offset 705 may be additionally applied, as indicated by reference numeral 750 (alternative #2). The frequency offset 705 may be preset by a system parameter or may be additionally configured by the gNB. Accordingly, the UE may need no additional configuration information for the control region 701 in the added beam pair link, or may receive an additional configuration only for a very limited change (for example, the frequency offset 705) from the gNB. This corresponds to step 608 of embodiment 1 described above.

As a result, if the downlink control channel is transmitted through a plurality of beam pair links, embodiment 2 of the disclosure includes an operation of repeatedly transmitting the downlink control channel a number of times corresponding to the number of beam pair links used for transmission. Accordingly, the configuration for the control region may be reused, and the DCI 702 may be transmitted using the same time/frequency resources (or resources having a specific frequency offset) for all downlink control channels transmitted through a plurality of beams. For example, a signal transmitted through beam pair link #1 703 may be repeatedly transmitted through beam pair link #2 704. Accordingly, the UE may implicitly know the number of times its own downlink control channel is repeatedly transmitted from the number of beam pair links used in the multi-beam mode (for example, corresponding to configuration information 1 in step 607 of embodiment 1) and accordingly perform a blind decoding operation.

Figure 8A:
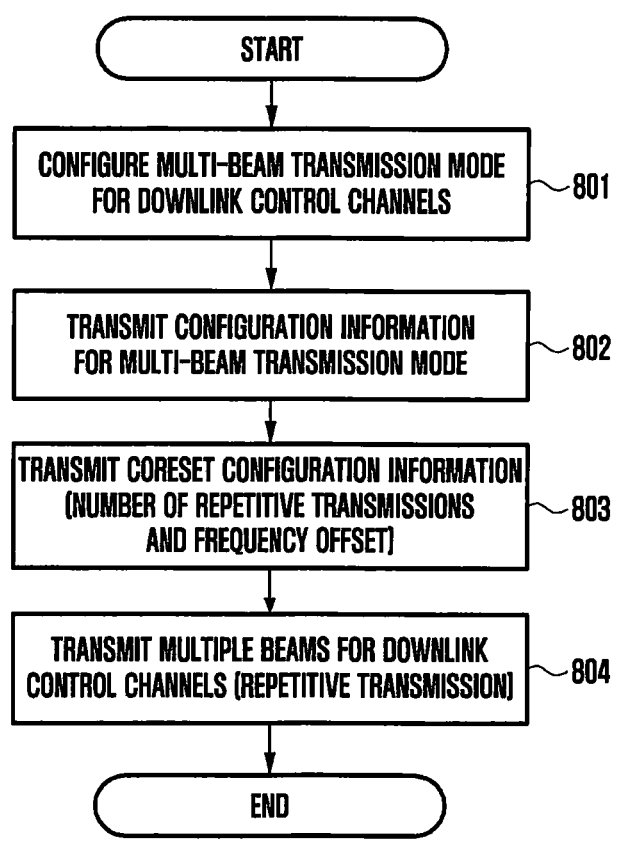
FIGS. 8A and 8B illustrate gNB and UE operations according to embodiment 2 of the disclosure.
Figure 8B:
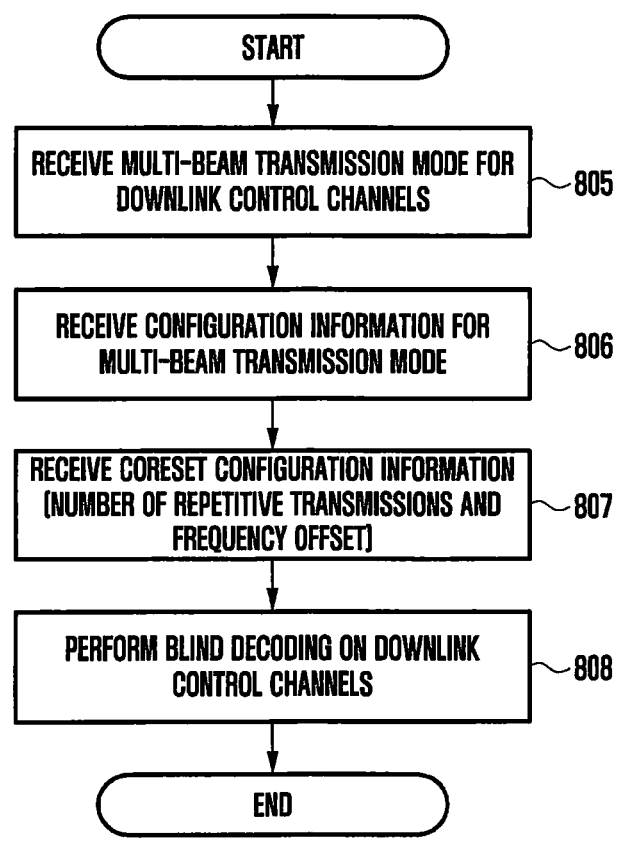

FIGS. 8A and 8B illustrate gNB and UE operations according to embodiment 2 of the disclosure.

First, the gNB procedure will be described. The gNB may configure a multi-beam transmission mode for a downlink control channel in the UE in step 801. The gNB may transmit configuration information for multiple beams to the UE in step 802. At this time, the configuration information for the multiple beams may follow embodiment 1-1. The gNB may transmit very limited configuration information of a control region (CORESET) for multiple beams, for example, the number of repetitive transmissions or a frequency offset, as necessary. Alternatively, if the corresponding configuration information is given through a system parameter or is implicitly obtained from other configuration information, step 803 may be omitted. The gNB transmits multiple beams for the downlink control channel on the basis of repetitive transmissions in step 804.

Subsequently, the UE procedure will be described. The UE may receive a configuration of a multi-beam transmission mode for a downlink control channel from the gNB in step 805. The UE may receive configuration information for multiple beams in step 806. The UE receives very limited configuration information of a control region (CORESET) for multiple beams, for example, repetitive transmissions or a frequency offset, in step 807, or if the corresponding configuration information is given through a system parameter or implicitly obtained from other configuration information, step 807 may be omitted. The UE may receive the downlink control channel transmitted through multiple beams in step 808. The UE may perform blind decoding on the downlink control channel.

In embodiment 2 of the disclosure, the blind decoding operation of the UE may be controlled differently. Hereinafter, an embodiment of the blind decoding operation of the UE will be described.

Embodiment 2-1

Figure 9:
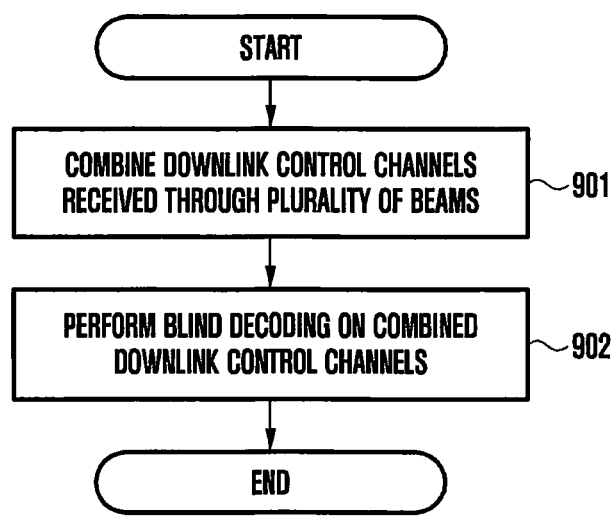
FIG. 9 illustrates a UE operation according to embodiment 2-1 of the disclosure.

FIG. 9 illustrates a method of performing a blind decoding operation for a downlink control channel by the UE according to embodiment 2-1 of the disclosure.

The UE may combine all control channels received through a plurality of beams in step 901. Combining received signals may mean an operation for compensating for distortion of channels for received signals (equalization) and then combining symbol levels for modulation signals transmitted through respective REs or an operation for compensating for channel distortion (equalization), calculating a log likelihood ration (LLR) value for bits transmitted through the modulation signals, and then combining bit levels. For example, M downlink control channels transmitted through M multiple beams may be combined and thus obtained as one. The UE may perform blind decoding on the combined downlink control channel once, and accordingly acquire DCI.

Embodiment 2-2

Figure 10:
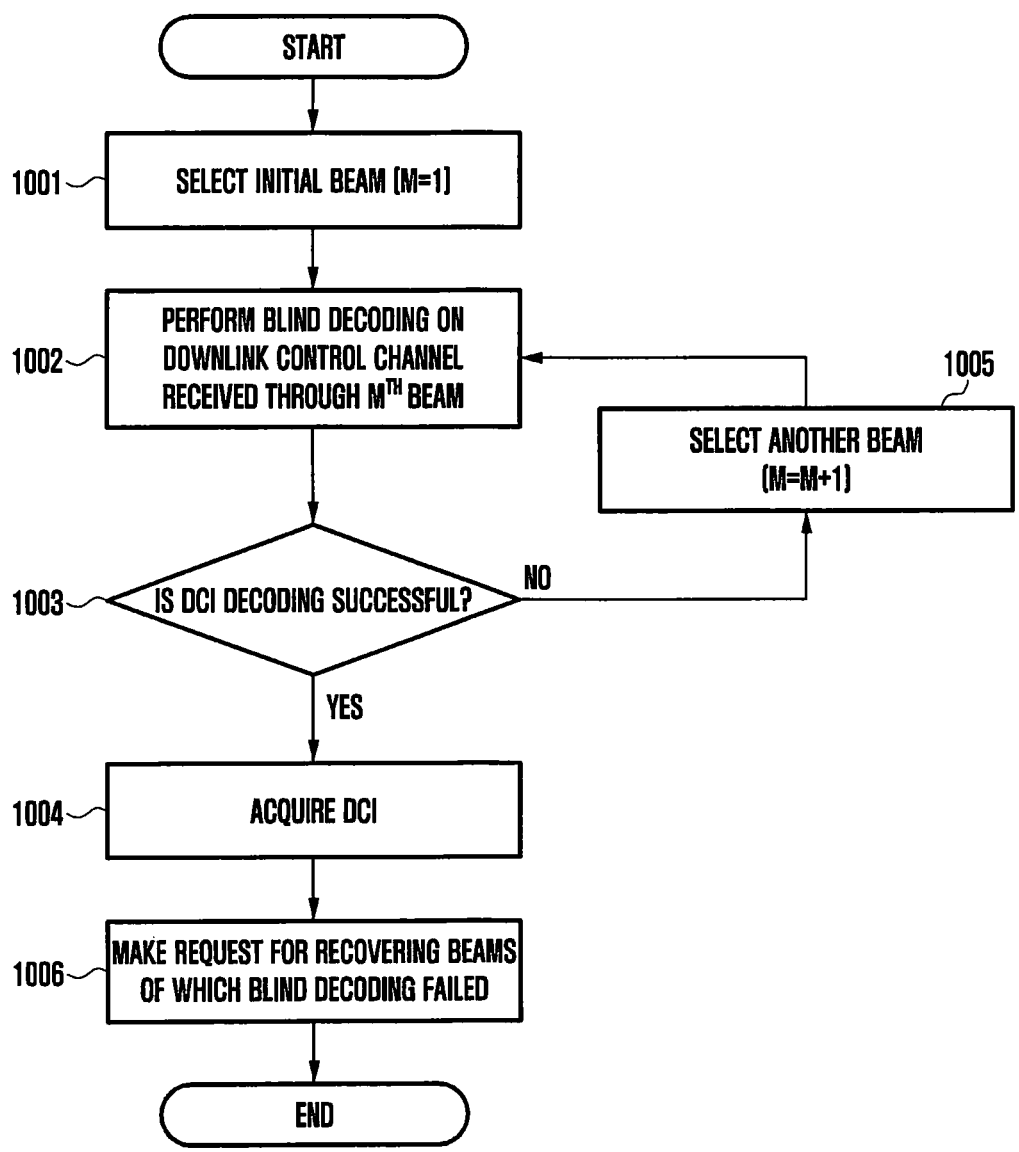
FIG. 10 illustrates a UE operation according to embodiment 2-2 of the disclosure.

FIG. 10 illustrates a method of performing a blind decoding operation for a downlink control channel by the UE according to embodiment 2-2 of the disclosure.

The UE may select an initial beam, for example, an $m^{th}=1^{st}$ beam, to perform blind decoding among the downlink control channels transmitted through a plurality of beams in step 1001. The UE may perform blind decoding on the downlink control channel received through the $m^{th}$ beam in step 1002. The UE may determine whether DCI decoding is successful on the basis of the corresponding beam in step 1003. If DCI decoding fails, the UE may select another beam, for example, an $m=m+1^{th}$ beam, to perform blind decoding in step 1004, and may then perform blind decoding again on the downlink control channel received through the corresponding beam in step 1002. If the UE succeeds in DCI decoding in step 1003, the UE may acquire DCI in step 1005. The UE may detect beam failure for beams of which blind decoding has failed and may accordingly make an additional request for beam recovery to the gNB in step 1006.

Embodiment 3

Figure 11:
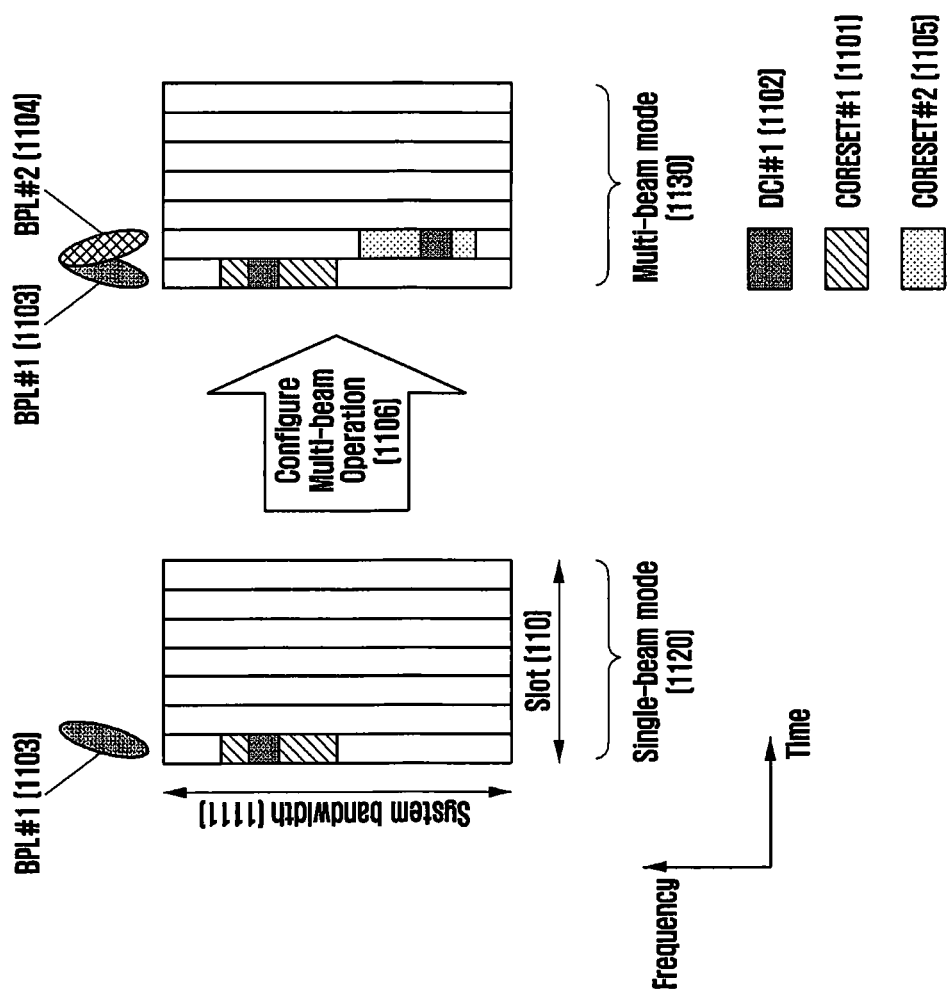
FIG. 11 illustrates embodiment 3 of the disclosure.

FIG. 11 illustrates a method of configuring the control region for the downlink control channel according to embodiment 3 of the disclosure.

FIG. 11 shows an example in which a system bandwidth 1111 on the frequency axis and a control region 1101 (CORESET #1) for one downlink control channel within one slot on the time axis are configured at specific time/frequency locations and DCI 702 (DCI #1) is transmitted at a specific location in the control region 1101. It is assumed that the downlink control channel is transmitted and received through a specific beam pair link, for example, beam pair link #1 1103, in a single-beam mode 1120. The gNB may configure a multi-beam mode 1130 for the downlink control channel in the UE, as indicated by reference numeral 1106, and it is assumed that the downlink control channel is transmitted using beam pair link #1 1103 and beam pair link #2 1104 in FIG. 11. The configuration 1106 for the multi-beam mode 1130 may be performed in the UE by the gNB on the basis of the configuration information described in embodiment 1-1. If the gNB additionally configures beam group information (corresponding to configuration information 3 in embodiment 1-1), each beam pair link of FIG. 11 may be equally interpreted as a beam group.

Simultaneously with the configuration of the multi-beam mode 1130, the gNB may additionally configure the control region 1101 for the downlink control channel transmitted through added or changed beam pair links. At this time, in embodiment 3 of the disclosure, a new control region, different from the control region 1101 used in the single-beam mode 1120, may be additionally configured for transmission of the downlink control channel in the added or changed beam pair link. In a more detailed embodiment, a control region 1105 in newly added beam pair link #2 1104 in the multi-beam mode 1130 of FIG. 11 may be additionally configured as control region #2 1105, different from the control region 1101 (control region #1) of beam pair link #1 1103. Accordingly, the UE may receive additional configuration information for the control region 1105 (for example, control region duration, control region resource allocation information, and a resource-mapping scheme in the control region) in the added beam pair link from the gNB. This corresponds to step 608 in embodiment 1.

Although the control regions for the downlink control channel are independently configured in a plurality of beam pair links in embodiment 3 of the disclosure, the gNB may repeatedly transmit the same DCI through each control region. For example, in FIG. 7, if the gNB transmits DCI #1 1102 through control region #1 1101 configured in beam pair link #1 1103, the same DCI #1 1102 may also be transmitted through control region #2 1105 configured in beam pair link #2 1104. Through such transmission, even though some of the beam pair links used for transmission are blocked, the DCI may be received through the other remaining beam pair links. Accordingly, the UE may independently perform blind decoding on respective downlink control channels transmitted through a plurality of beams on the basis of different configurations.

Embodiment 3-1

In embodiment 3 of the disclosure, control regions of respective beam pair links may be configured to have different characteristics. For example, control regions transmitted in respective beam pair links may be configured to have different transmission periods, for example, different monitoring periods. In a more detailed example, in FIG. 11, control region #1 1101 of beam pair link #1 1103 may be configured to be monitored by the UE in every $m^{th}$ slot, and control region #2 1105 of beam pair link #2 1104 may be configured to be monitored by the UE in every $n^{th}$ slot. For example, if beam pair link #1 1103 is configured as the main beam pair group (see embodiment 1-1), the monitoring period of control region #1 1101 of beam pair link #1 1103 may be configured to be shorter (for example, in every slot). If beam pair link #2 1104 is configured as the sub beam pair group (see embodiment 1-1), the monitoring period of control region #2 1105 of beam pair link #2 1104 may be configured to be longer (for example, in every third slot). Accordingly, overhead attributable to multi-beam transmission for the downlink control channels can be efficiently managed.

Embodiment 3-2

In embodiment 3 of the disclosure, control regions of respective beam pair links may be configured to have different characteristics. For example, some of a plurality of beam pair links may follow normal control region configuration information (for example, the configuration information shown in [Table 1], which is referred to as basic control regions) and the remaining beam pair links may follow control region configuration information designed for a specific purpose, which are different control regions (referred to as special control regions). In a more detailed example, the following special control region configuration information may be considered.

First special control region configuration information (for enhanced transmission)
A higher aggregation level (for example, 16 or 32), a larger number of control channel candidates, and higher DMRS density or a larger number of ports are supported Second special control region configuration information (for lightened transmission)
A lower aggregation level (for example, ¼ or ½), a smaller number of control channel candidates, and lower DMRS density or a smaller number of ports are supported The special control region configuration information may be configured by parameters related to various control region configurations in addition to the above-listed examples. A control region configured on the basis of the first special control region configuration information is characterized by higher reliability than the normal control region. A control region configured on the basis of the second special control region configuration information is characterized in that blind decoding complexity is simplified compared to the normal control region, which is advantageous to transmission of DCI having a small-sized payload. Referring to FIG. 11, for example, control region #1 1101 of beam pair link #1 1103 may be configured as the basic control region, and control region #2 1105 of beam pair link #2 1104 may be configured as the special control region. Which beam pair link is configured as the special control region may be determined by the gNB, for example, on the basis of grouping (the main beam group and the sub beam group) described in embodiment 1-1.

A combination of embodiment 3-1 and embodiment 3-2 described above may be used.

Figure 12A:
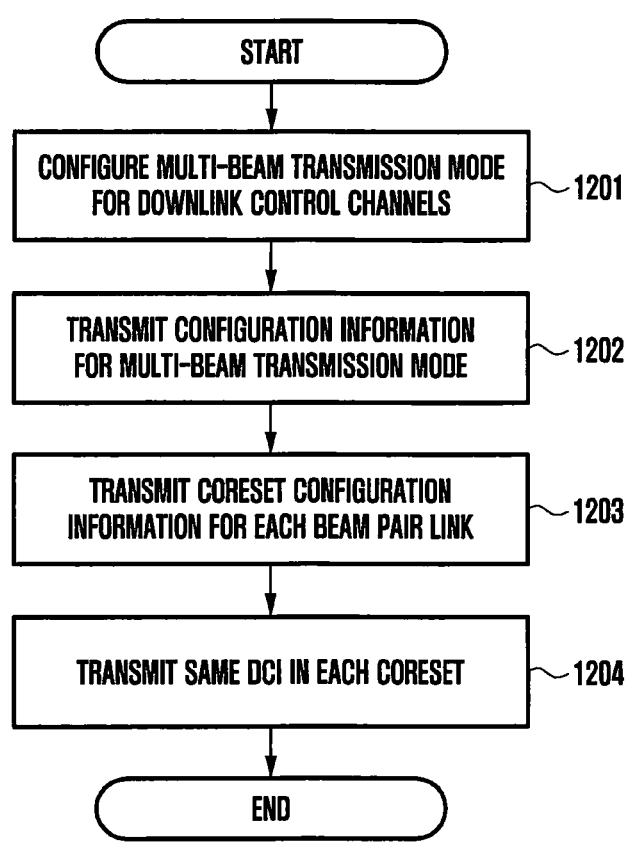
FIGS. 12A and 12B illustrate gNB and UE operations according to embodiment 3 of the disclosure.
Figure 12B:
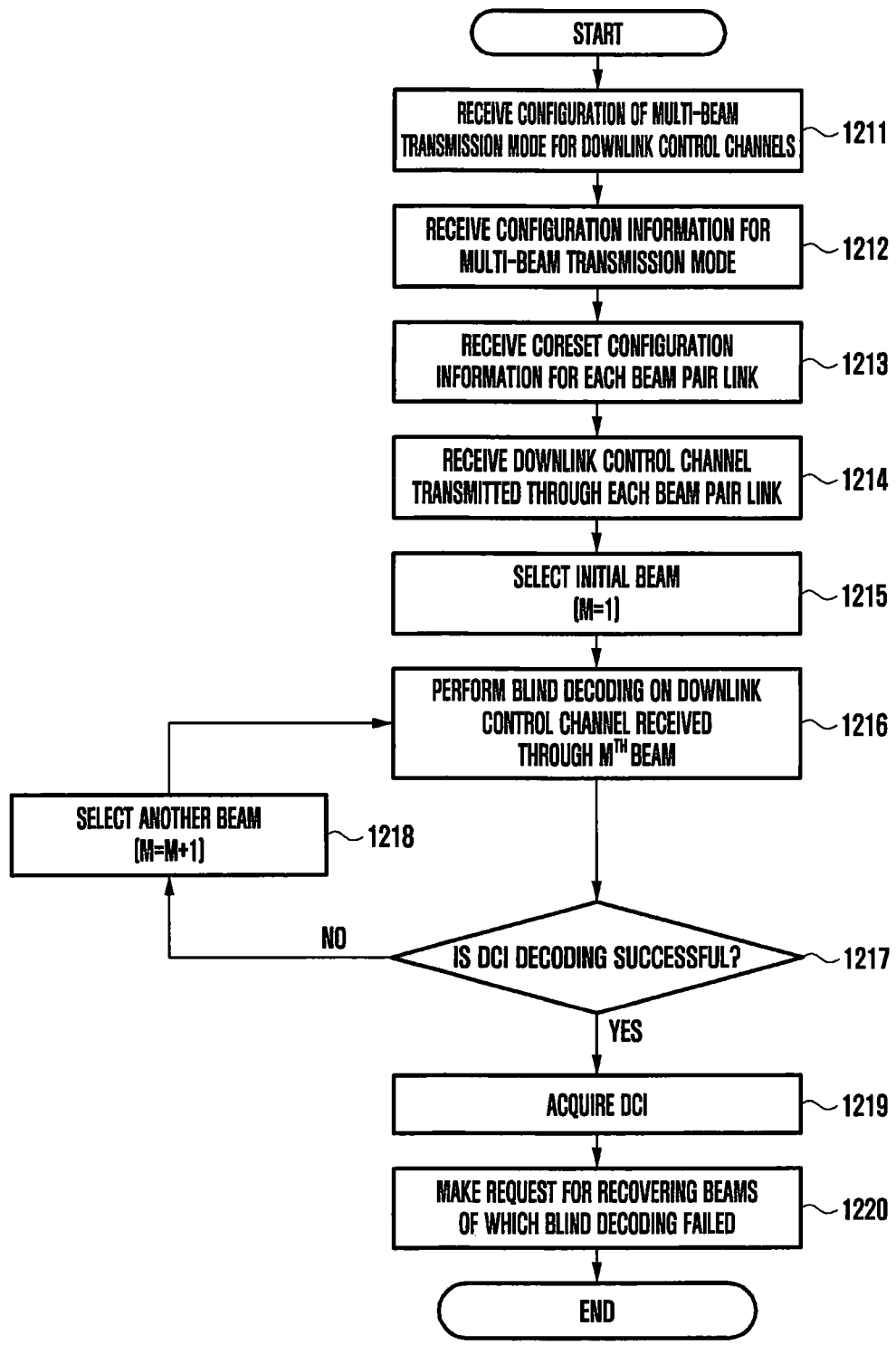

FIGS. 12A and 12B illustrate gNB and UE operations according to embodiment 3 (including embodiment 3-1 and embodiment 3-2) of the disclosure.

First, the gNB procedure will be described. The gNB may configure a multi-beam transmission mode for a downlink control channel in the UE in step 1201. The gNB may transmit configuration information for multiple beams to the UE in step 1202. At this time, the configuration information for the multiple beams may follow embodiment 1-1. The gNB may transmit control region (CORESET) configuration information for each beam pair link to the UE in step 1203. The gNB may transmit the same DCI in all downlink control channels (for example, CORESETs configured in respective beam pair links) transmitted in respective beam pair links in step 1204.

Subsequently, the UE procedure will be described. The UE may receive the configuration of a multi-beam mode for the downlink control channel from the gNB in step 1211. The UE may receive configuration information for multiple beams in step 1212. The UE may receive control region configuration information for each beam pair link in step 1213. At this time, embodiment 3-1 and embodiment 3-2, described above, may be additionally considered. As described above, the beam pair link may be interpreted to be the same as the beam group. The UE may receive the downlink control channel transmitted through multiple beams in step 1214. The UE may select an initial beam, for example, an $m^{th}=1^{st}$ beam, to be blind-decoded among the downlink control channels transmitted through a plurality of beams in step 1215. The UE may perform blind decoding on the downlink control channel received through the $m^{th}$ beam in step 1216. The UE may determine whether DCI decoding is successful on the basis of the corresponding beam in step 1217. If DCI decoding fails, the UE may select another beam, for example, an $m=m+1^{th}$ beam, to perform blind decoding in step 1218, and may then perform blind decoding again on the downlink control channel received through the other beam in step 1216. If the UE succeeds in DCI decoding in step 1217, the UE may acquire DCI in step 1219. The UE may detect beam failure for beams of which blind decoding has failed and may accordingly make an additional request for beam recovery to the gNB in step 1220.

Embodiment 4

Figure 13:
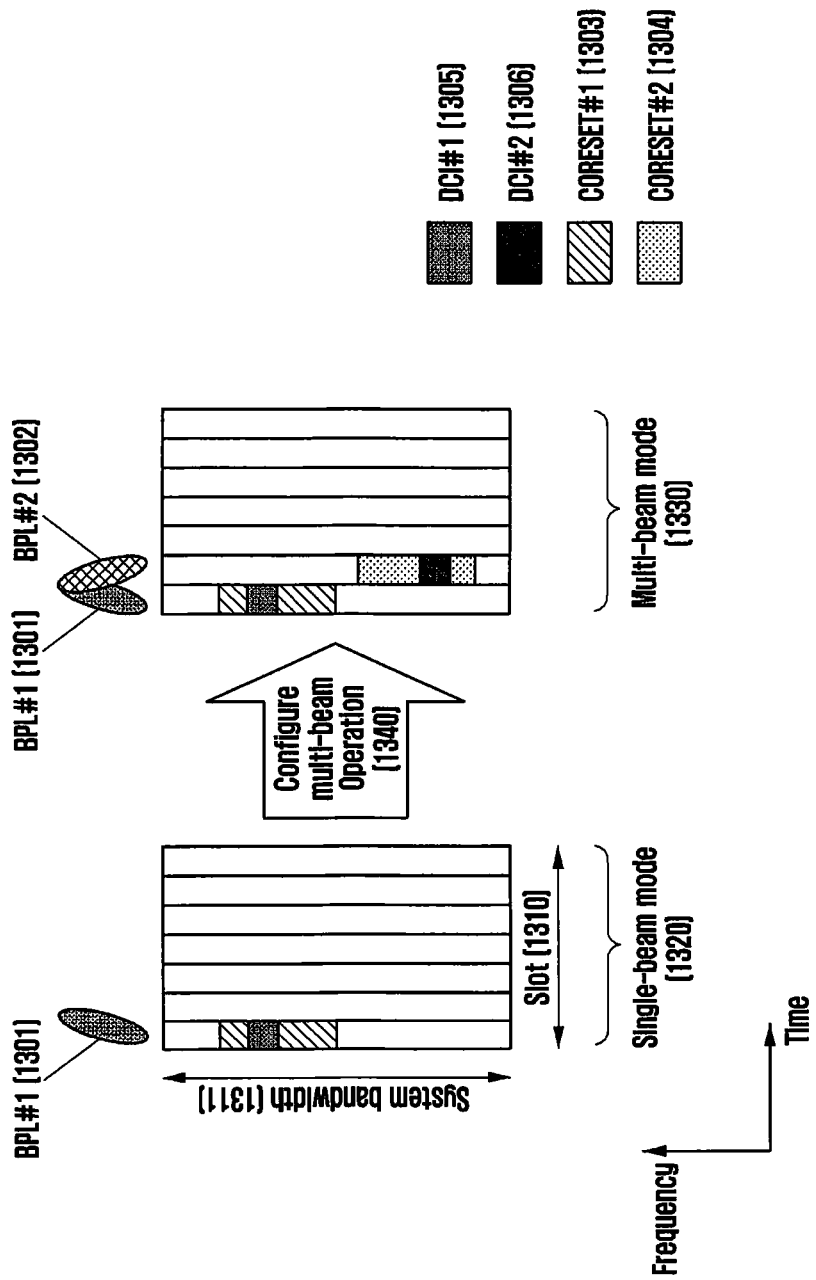
FIG. 13 illustrates embodiment 4 of the disclosure.

FIG. 13 illustrates a method of configuring a control region for a downlink control channel and a method of transmitting DCI according to embodiment 4 of the disclosure. The method basically follows the same control region configuration method as embodiment 3 of the disclosure. The same description made above will be omitted. In embodiment 4 of the disclosure, different pieces of DCI may be transmitted in respective control regions configured in respective beam pair links.

Referring to FIG. 13, in embodiment 4 of the disclosure, if the multi-beam mode 1330 for the downlink control channel is configured as in embodiment 3 of the disclosure, a control region for transmission of a changed/added beam pair link may be additionally configured. In the example of FIG. 13, control region #1 1303 may be configured in beam pair link #1 1301, and control region #2 1304 may be configured in beam pair link #2 1302. At this time, different pieces of DCI may be transmitted through respective beam pair links in embodiment 4 of the disclosure. For example, DCI #1 1305 may be transmitted through control region #1 1303 of beam pair link #1 1301 and DCI #2 1306 may be transmitted through control region #2 1304 of beam pair link #2 1302.

In embodiment 4 of the disclosure, each piece of DCI transmitted through a specific beam pair link may additionally include an indicator indicating whether DCI is transmitted through another beam pair link. For example, if DCI #1 1305 and DCI #2 1306 are transmitted through beam pair link #1 1301 and beam pair link #2 1302, respectively, as illustrated in FIG. 13, each piece of the DCI may include the following information.

DCI #1: indicator indicating whether DCI #2 is transmitted

DCI #2: indicator indicating whether DCI #1 is transmitted

If acquisition of DCI through a specific beam pair link fails, the UE may determine if the gNB does not actually transmit the DCI, in which case the UE does not find the DCI, or if the corresponding beam pair is blocked, in which case the UE does not receive the DCI, on the basis of the information. In a detailed example, it is assumed that DCI #1 1305 is transmitted through beam pair link #1 1301, DCI #2 1306 is transmitted through beam pair link #2 1302, and only beam pair link #1 1301 is blocked, as shown in FIG. 13. At this time, the UE may fail in acquisition of DCI #1 1305 and acquire DCI #2 1306 through blind decoding in CORESET #2 1304 of beam pair link #2 1302. The UE may acquire an indicator indicating whether DCI #1 1305 is transmitted on the basis of the acquired DCI #2 1306. Accordingly, the UE may recognize the fact that DCI #1 1305 is transmitted through beam pair link #1 1301. The UE may consider that beam pair link #1 1301 is blocked and thus the UE may not receive DCI #1 1305, and accordingly may make a request for a beam recovery procedure to the gNB.

As described above, if DCI transmitted in a specific beam pair link additionally includes the indicator indicating whether DCI is transmitted in another beam pair link, the UE may determine whether to perform blind decoding on the downlink control channel transmitted through the other beam pair link. In a detailed embodiment, it is assumed that DCI #1 1305 is transmitted through beam pair link #1 1301 and that DCI is not transmitted through beam pair link #2 1302. If the UE succeeds in blind decoding in control region #1 1303 transmitted through beam pair link #1 1301 and then acquires DCI #1 1305, the UE may acquire an indicator indicating whether DCI #2 1306 is transmitted on the basis of the acquired DCI #1 1305. Accordingly, the UE may recognize the fact that DCI is not transmitted in beam pair link #2 1304 on the basis thereof. In this case, the UE may not perform blind decoding in beam pair link #2 1302.

The aforementioned indicator indicating whether DCI is transmitted may be transmitted in some beam pair links rather than in all beam pair links. For example, an indicator indicating whether DCI #1 1305, transmitted through beam pair link #1 1301, is transmitted may be included only in DCI #2 1306 transmitted through beam pair link #2 1302.

In order to more efficiently operate embodiment 4 of the disclosure, a combination of the beam-grouping methods described in embodiment 1-1 may be applied. For example, beam pair link #1 may configured as the main beam group and beam pair link #2 may be configured as the sub beam group in FIG. 13.

At this time, DCI transmitted through the main beam group and the sub beam group may be differently configured (for example, DCI formats for transmission may be differently configured according to the beam group). For example, the main beam group may be configured to transmit DCI corresponding to downlink scheduling allocation, and the sub beam group may be configured to transmit DCI corresponding to uplink grant information.

Alternatively, the main beam group may be configured to transmit normal DCI, and the sub beam group may be configured to transmit a special DCI format. For example, the special DCI format may be used for beam-blocking detection and beam recovery processes in transmission of multiple beams for downlink control channels. For example, the special format may include the following information.

A special DCI format
  A response to a beam recovery request, configuration information for a new beam link, and an indicator for triggering training for forming a new beam link Accordingly, it is possible to efficiently manage blind decoding complexity and transmission overhead due to the use of multiple beams.

Alternatively, an indicator indicating whether there is DCI transmitted through the main beam group may be included only in DCI transmitted through the sub beam group. Alternatively, only the indicator indicating whether there is DCI transmitted through the main beam group may be transmitted through the sub beam group. As described above, if only limited DCI is transmitted through the sub beam group, the control region of the sub beam group may be configured to follow special control region configuration (for example, second special control region configuration) information through a combination with embodiment 3-2 described above.

Alternatively, only some content of the DCI transmitted through the main beam group may be transmitted through DCI of the sub beam group.

In addition, the purposes of the main beam group and the sub beam group may be determined in various ways, and different pieces of DCI may be transmitted.

Figure 14:
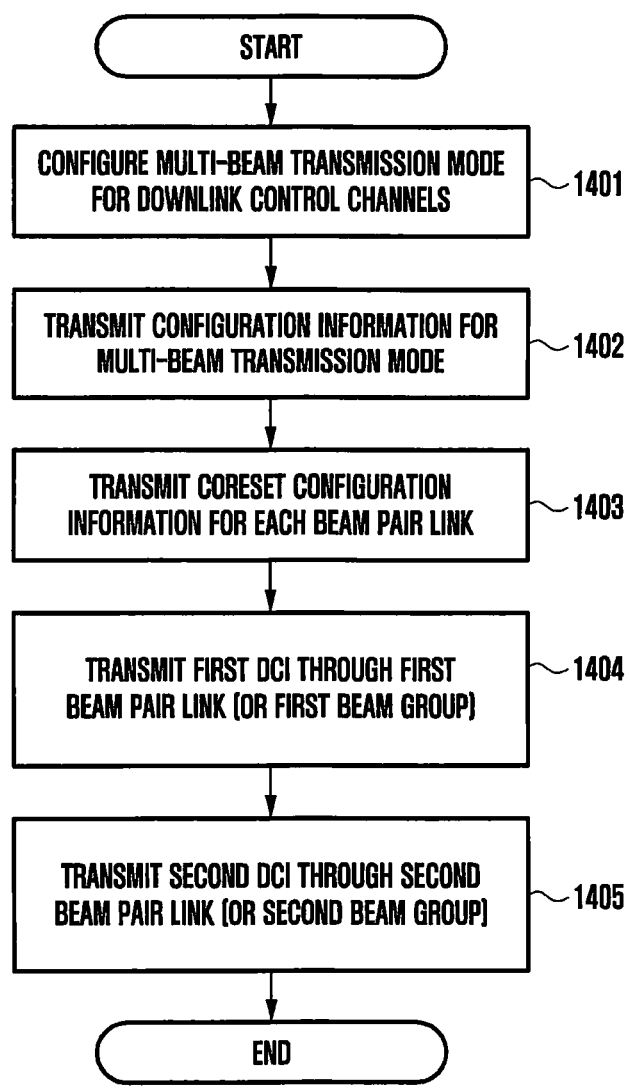
FIG. 14 illustrates a gNB operation according to embodiment 4 of the disclosure.

FIG. 14 illustrates a gNB operation according to embodiment 4 of the disclosure.

The gNB may configure a multi-beam transmission mode for a downlink control channel in the UE in step 1440. The gNB may transmit configuration information for multiple beams to the UE in step 1450. At this time, the configuration information for the multiple beams may follow embodiment 1-1. The gNB may transmit control region (CORESET) configuration information for each beam pair link to the UE in step 1403. The gNB may transmit different pieces of DCI through respective beam pair links in steps 1404 and 1405. For convenience of description, the embodiment of FIG. 14 considers the situation in which downlink control channels are transmitted through two beam pair links (or two beam groups in the same way). Accordingly, the gNB may transmit first DCI through a first beam pair link (or a first beam group) in step 1404, and may transmit second DCI through a second beam pair link (or a second beam group) in step 1405. At this time, each piece of DCI may include an indicator indicating whether DCI is transmitted in another beam pair link (see embodiment 4).

Figure 15:
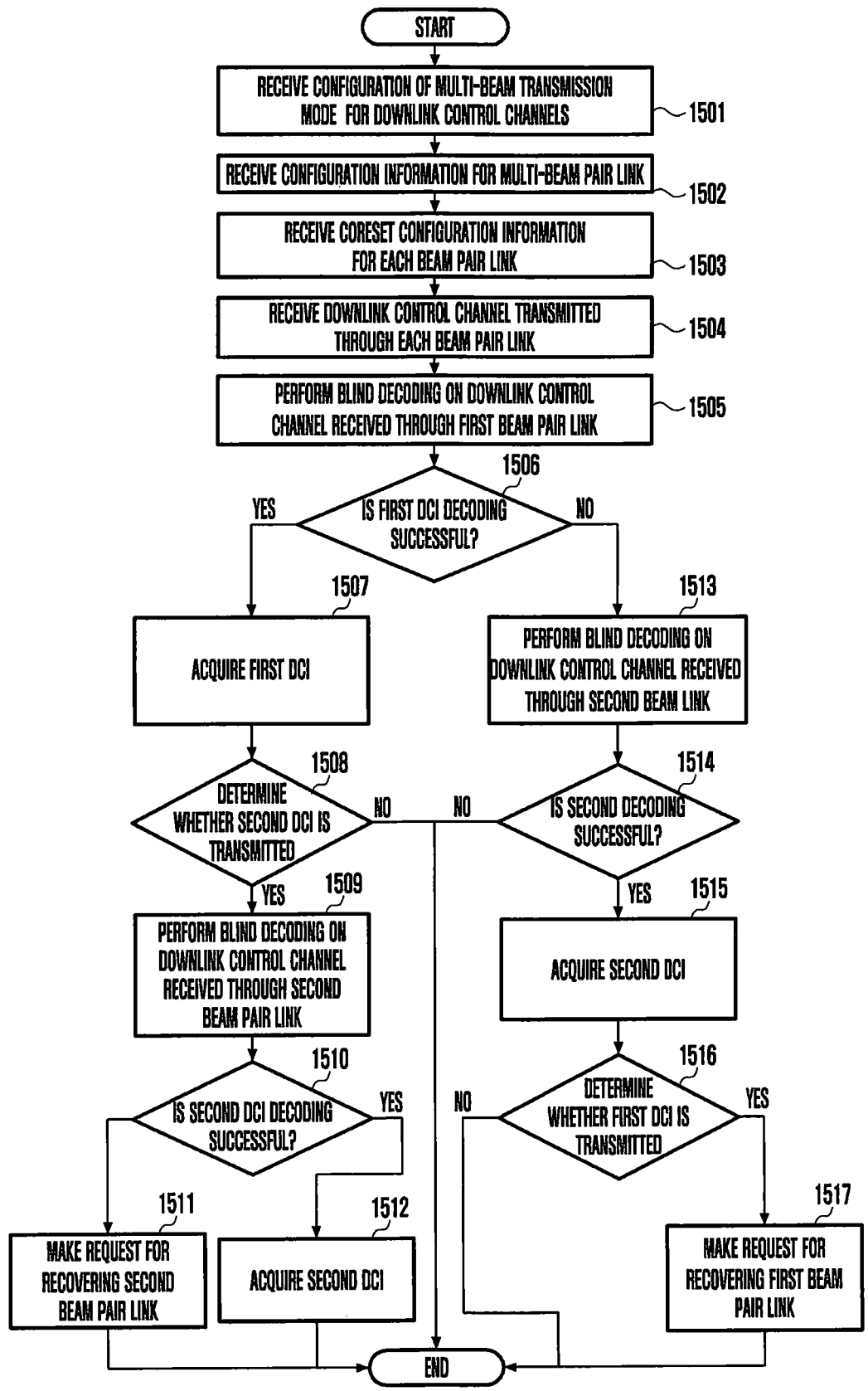
FIG. 15 illustrates a UE operation according to embodiment 4 of the disclosure.

FIG. 15 illustrates a UE operation according to embodiment 4 of the disclosure.

As described above, in the UE operation, it is assumed that downlink control channels are transmitted through two beam pair links (or through two beam groups in the same way). This is only for convenience of description, and may be equally applied to the case in which transmission is performed through a predetermined number of beam pair links. Further, as described in embodiment 1-1, the beam pair link and the beam group may be interpreted to be the same as each other.

The UE may receive the configuration of a multi-beam transmission mode for the downlink control channel from the gNB in step 1501. The UE may receive configuration information for multiple beams in step 1502. The UE may receive control region configuration information for each beam pair link step 1503. The UE may receive the downlink control channel transmitted through multiple beams in step 1504. The UE may perform blind decoding on a downlink control channel received through a first beam pair link (or a first beam group) in step 1505.

The UE may determine whether decoding of the first DCI is successful in step 1506. If the first DCI is successfully decoded, the UE may acquire the first DCI in step 1507. The UE may determine whether second DCI is transmitted on the basis of the acquired first DCI in step 1508. If it is determined that the second DCI is not transmitted in step 1508, the UE may end the blind decoding without performing blind decoding on the downlink control channel transmitted through the second beam pair link. If it is determined that the second DCI is transmitted in step 1508, the UE may perform blind decoding on the downlink control channel transmitted through the second beam pair link in step 1509. The UE may determine whether the second DCI is successfully decoded in step 1510, and if the second DCI is successfully decoded, may acquire the second DCI and end the blind decoding in step 1512. If the decoding of the second DCI fails in step 1510, the UE may determine that the second beam pair link is blocked and may then make a request for recovery of the corresponding beam in step 1511.

The UE may determine whether decoding of the first DCI is successful in step 1506. If decoding of the first DCI fails, the UE may perform blind decoding on the downlink control channel transmitted through the second beam link in step 1513. The UE may determine whether decoding of the second DCI is successful in step 1514. If the decoding of the second DCI fails, the UE may directly end the decoding on the downlink control channel. If the second DCI is successfully decoded, the UE may acquire the second DCI in step 1515. The UE may determine whether the first DCI is transmitted on the basis of the acquired second DCI in step 1516. If it is determined that the first DCI is not transmitted in step 1516, the UE may directly end the operation. If it is determined that the first DCI is transmitted in step 1516, the UE may determine that the first beam pair link is blocked, and may then make a recovery request for the corresponding beam in step 1517.

Embodiment 5

Figure 16:
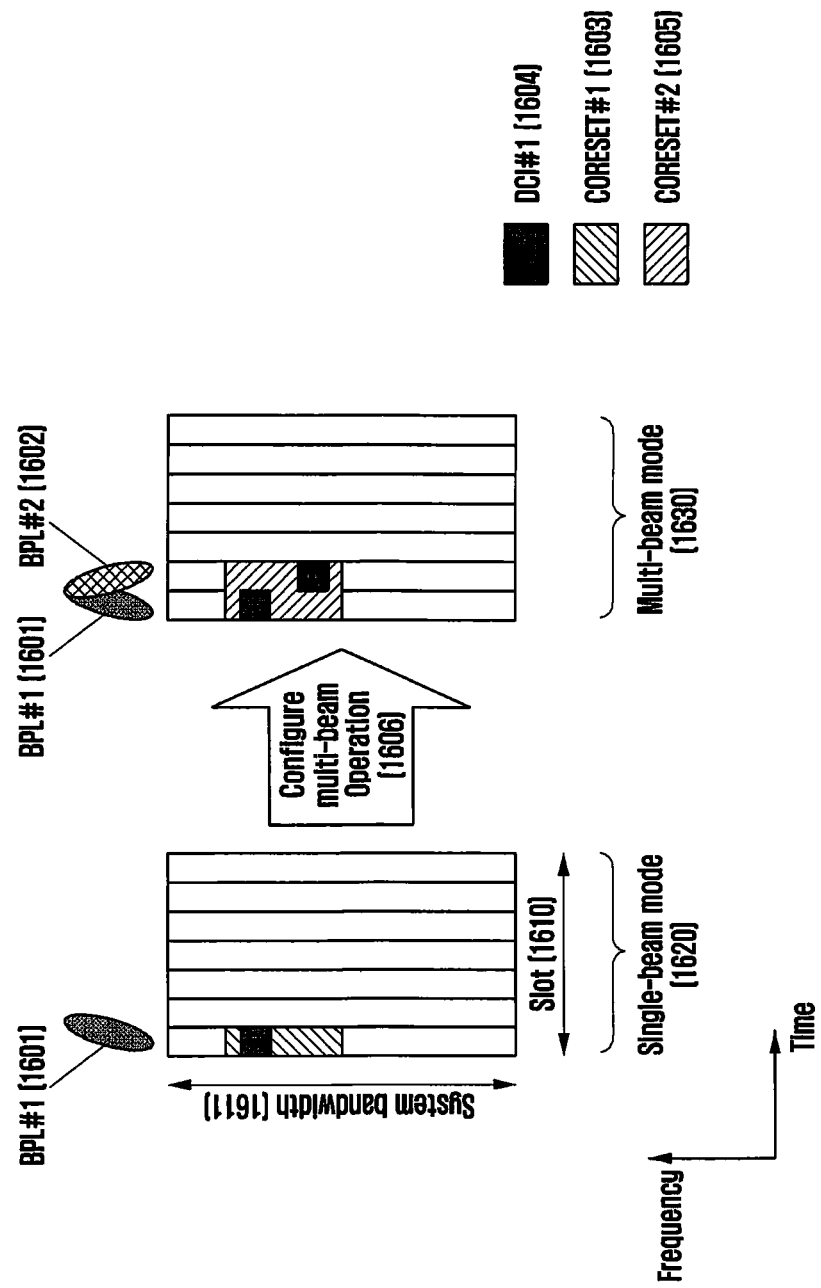
FIG. 16 illustrates embodiment 5 of the disclosure.

FIG. 16 illustrates a method of configuring a control region for a downlink control channel and a method of transmitting DCI according to embodiment 5 of the disclosure.

FIG. 16 shows an example in which a system bandwidth 1611 on the frequency axis and a control region 1601 (CORESET #1) for one downlink control channel within one slot on the time axis are configured at specific time/frequency locations and DCI 1604 (DCI #1) is transmitted at a specific location in the control region 1601. It is assumed that the downlink control channel is transmitted and received through a specific beam pair link, for example, beam pair link #1 1601, in a single-beam mode 1620. The gNB may configure a multi-beam mode 1630 for the downlink control channel in the UE, as indicated by reference numeral 1606. In FIG. 16, it is assumed that the downlink control channels are transmitted through beam pair link #1 1601 and beam pair link #2 1602. If the gNB additionally configures beam group information (corresponding to configuration information 3 in embodiment 1-1), each beam pair link of FIG. 16 may be equally understood to be a beam group.

In embodiment 5 of the disclosure, the gNB may configure the multi-beam mode 1630 and may also configure a new control region by reflecting the number of OFDM symbols through which downlink control channels, changed due to added or changed beam pair links, can be transmitted. In a more detailed example, as beam pair link #1 1601 and beam pair link #2 1602 are used according to the multi-beam mode 1630 in FIG. 16, the number of OFDM symbols through which the downlink control channel can be transmitted may increase compared to the single-beam mode 1620 (an increase from one symbol to two symbols in the example of FIG. 16). Accordingly, the gNB may again configure the control regions in consideration thereof, and at this time, one control region may be configured for a plurality of beam pair links. In the example of FIG. 16, one control region #2 1605 may be configured over a first OFDM symbol transmitted through beam pair link #1 1601 and a second OFDM symbol transmitted through beam pair link #2 1602.

In embodiment 5 of the disclosure, the control region (control region #2 1605) in the multi-beam mode 1630 may be configured in various ways. For example, the control region in the multi-beam mode may follow the same configuration as the control region (control region #1 1603) in the single-beam mode 1620, but only the control region duration, for example, the number of OFDM symbols, may be configured to be suitable for multi-beam transmission. In another example, new control region #2 1605 may be configured independently from control region #1 1603.

In embodiment 5 of the disclosure, a search space within the control region configured in consideration of the multi-beam mode 1630 may be configured for each beam pair link. For example, in FIG. 16, a specific search space within control region #2 1605 may be configured to exist within an OFDM symbol using beam pair link #1 1601. Further, another search space may be configured to exist within an OFDM symbol using beam pair link #2 1602. Accordingly, even though a specific beam pair link is blocked, the UE may receive DCI through another search space.

In embodiment 5 of the disclosure, the gNB may transmit the same DCI through individual search spaces configured in respective beam pair links. Accordingly, if the UE performs blind decoding on a search space existing in control region #2 1605 and succeeds in DCI decoding in a search space existing in a specific beam pair link, the UE may skip blind decoding on a search space existing in another beam pair link.

Figure 17A:
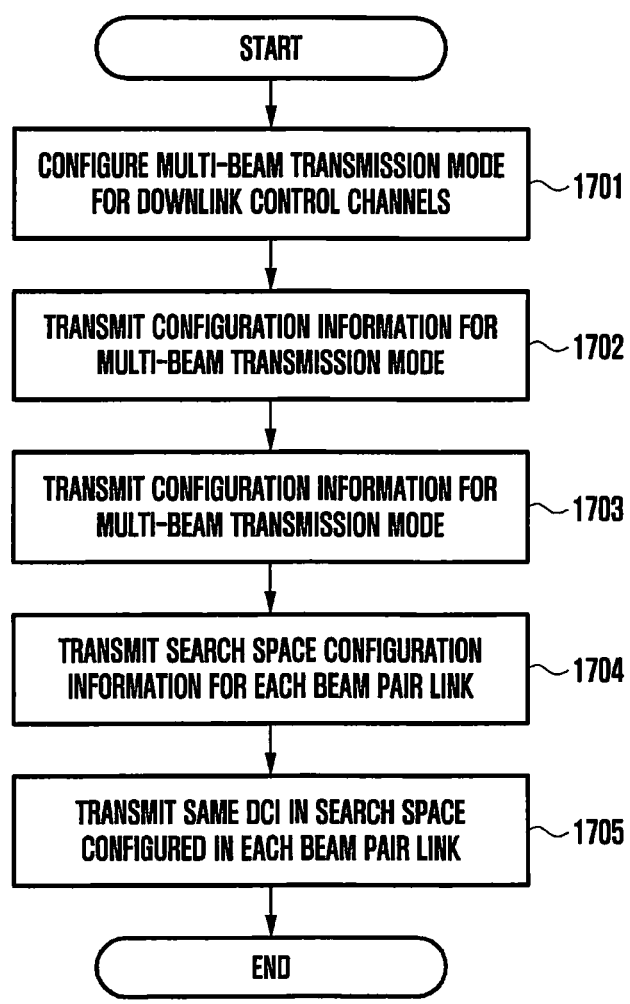
FIGS. 17A and 17B illustrate gNB and UE operations according to embodiment 5 of the disclosure.
Figure 17B:
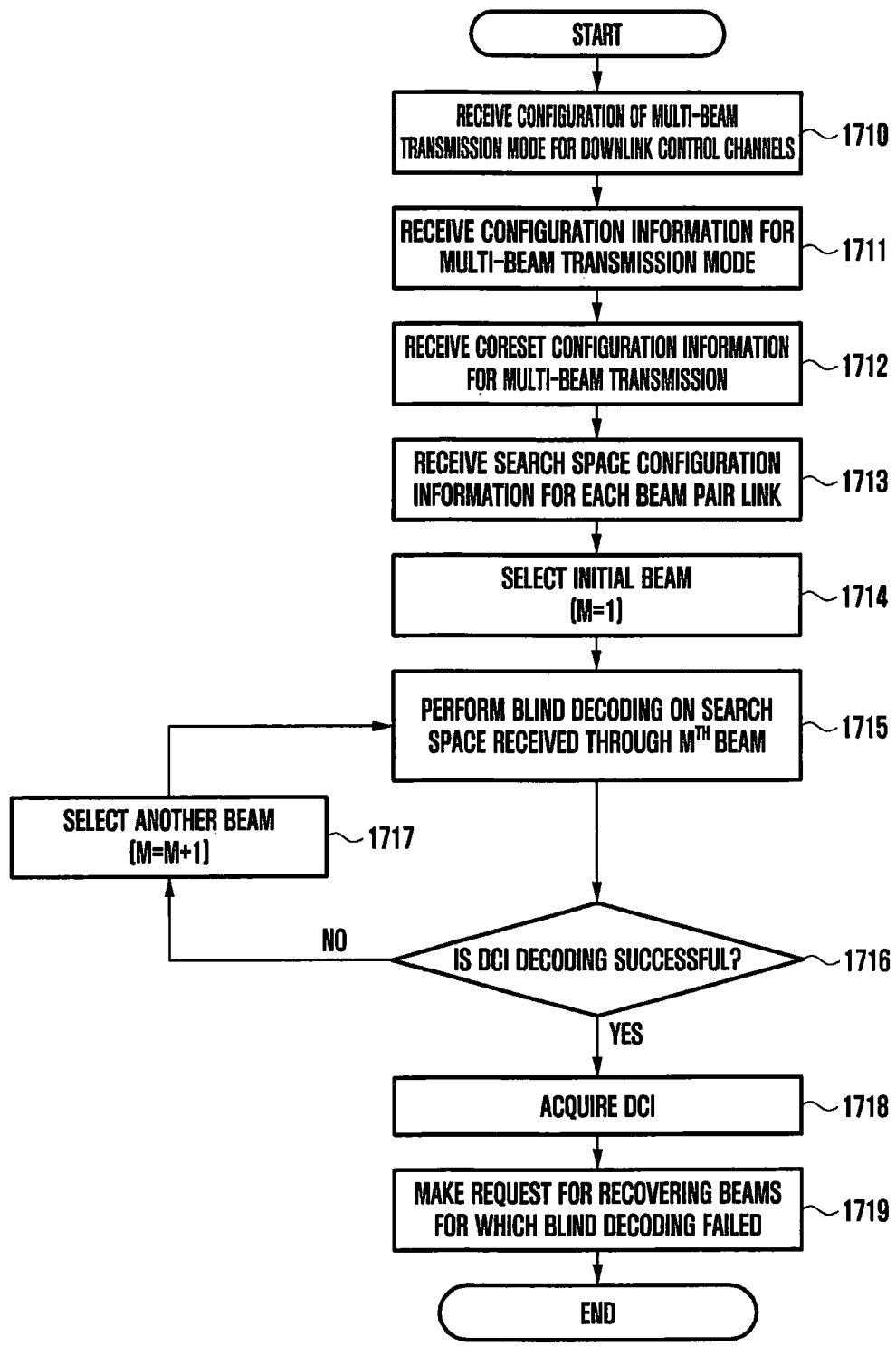

FIGS. 17A and 17B illustrate gNB and UE operations according to embodiment 5 of the disclosure.

First, the gNB procedure will be described. The gNB may configure a multi-beam transmission mode for a downlink control channel in the UE in step 1701. The gNB may transmit configuration information for multiple beams to the UE in step 1702. At this time, the configuration information for the multiple beams may follow embodiment 1-1. The gNB may transmit control region (CORESET) configuration information for multi-beam transmission to the UE in step 1703. The control region configuration method may follow embodiment 5 of the disclosure described above. The gNB may transmit search space configuration information for each beam pair link in step 1704. If the search space configuration method uses a function of a specific system parameter (for example, the number of OFDM symbols of the control region or a method of mapping resources to the control region), the search space configuration implicitly agreed upon between the gNB and the UE may be used without transmission of additional configuration information. The gNB may transmit the same DCI through search spaces existing in respective beam pair links in step 1705.

Subsequently, the UE procedure will be described. The UE may receive the configuration of a multi-beam mode for the downlink control channel from the gNB in step 1710. The UE may receive configuration information for multiple beams in step 1711. The UE may receive control region configuration information according to transmission of all multiple beams in step 1712. The UE may receive configuration information for search spaces existing in respective beam pair links in step 1713. As described above, if implicit indication through system parameter functions is possible, the above process may be omitted. The UE may select an initial beam, for example, $m^{th}=1^{st}$ beam, to perform blind decoding among the search spaces transmitted through a plurality of beams in step 1714. The UE may perform blind decoding on the search space received through the $m^{th}$ beam in step 1715. The UE may determine whether DCI decoding is successful in the corresponding beam pair link in step 1716. If DCI decoding fails, the UE may select another beam, for example, an $m=m+1^{th}$ beam, to perform blind decoding in step 1717, and may then perform blind decoding again on the search space received through the other beam in step 1715. If the terminal succeeds in DCI decoding in step 1716, the terminal may acquire DCI in step 1718. The terminal may detect beam failure for beams of which blind decoding has failed and accordingly make an additional request for beam recovery to the gNB in step 1719.

Embodiment 6

In embodiment 6 of the disclosure, the aforementioned various embodiments may be determined by the configuration of the gNB and applied to the method of transmitting downlink control channels through a plurality of beam pair links. For example, various methods of transmitting downlink control channels through a plurality of beam pair links may be defined as follows.

[First transmission mode] A downlink control channel is repeatedly transmitted through a plurality of beam pair links (for example, corresponding to embodiment 1 of the disclosure).

[Second transmission mode] A plurality of control regions may be independently configured for each of a plurality of beam pair links, and the same DCI may be repeatedly transmitted through each beam pair link (for example, corresponding to embodiment 3 of the disclosure).

[Third transmission mode] A plurality of control regions may be independently configured for each of a plurality of beam pair links, and independent DCI may be transmitted for each beam pair link (for example, corresponding to embodiment 4 of the disclosure).

[Fourth transmission mode] One control region may be configured over a plurality of beam pair links, a search space may be configured for each beam pair link, and the same DCI may be repeatedly transmitted for each beam pair link (for example, corresponding to embodiment 5 of the disclosure).

In addition to the above-described transmission modes, various other methods may exist. For an operation of transmitting the downlink control channel through a plurality of beam pair links, the gNB may select one of various transmission modes and configure the selected transmission mode in the UE. For example, one transmission operation among the embodiments of the disclosure described above may be configured and operated in the UE. The gNB may signal information on which transmission mode is used for transmission to the UE through higher-layer signaling (RRC or MAC CE signaling). The UE may know which transmission mode is used for transmitting the downlink control channel by the gNB on the basis of the received configuration information, and may perform a reception operation corresponding to the corresponding transmission mode. At this time, the reception operation of the UE may vary depending on the transmission mode. For example, operations corresponding to each UE operation in each embodiment described above may be performed by the UE.

Embodiment 6-1

In embodiment 6-1 of the disclosure, if the gNB and the UE transmit and receive downlink control channels through a plurality of beam pair links, the gNB may configure whether to combine the downlink control channels received by the UE through different beam links. Combining (combination) may follow the definition described in <Embodiment 2-1> of the disclosure above. The corresponding configuration may be transferred to the UE from the gNB through higher-layer signaling (for example, RRC or MAC CE signaling). The UE receiving the configuration indicating combining (combination) may assume that the same DCI is transmitted in downlink control channels transmitted through a plurality of beam pair links, and may perform blind decoding after performing combining.

If the method of transmitting and receiving a plurality of beams for downlink control channels follows the [First transmission mode] (or Embodiment 2), the UE may assume repetitive transmission of the same control channel and may perform decoding after combining N NR-PDCCH candidates transmitted through N beams at the same frequency location.

If the method of transmitting and receiving a plurality of beams for downlink control channels follows the [Second transmission mode] (or Embodiment 3), the UE may assume repetitive transmission of the same DCI, and may perform decoding after combining NR-PDCCH candidates having the same NR-PDCCH candidate index among NR-PDCCH candidates within a search space existing within a control region configured in N beams.

If the method of transmitting and receiving a plurality of beams for downlink control channels follows the [Fourth transmission mode] (or Embodiment 5), the UE may assume repetitive transmission of the same DCI, and may perform decoding after combining NR-PDCCH candidates having the same AL transmitted through different beams, among NR-PDCCH candidates within a search space configured in N beams.

Figure 18A:
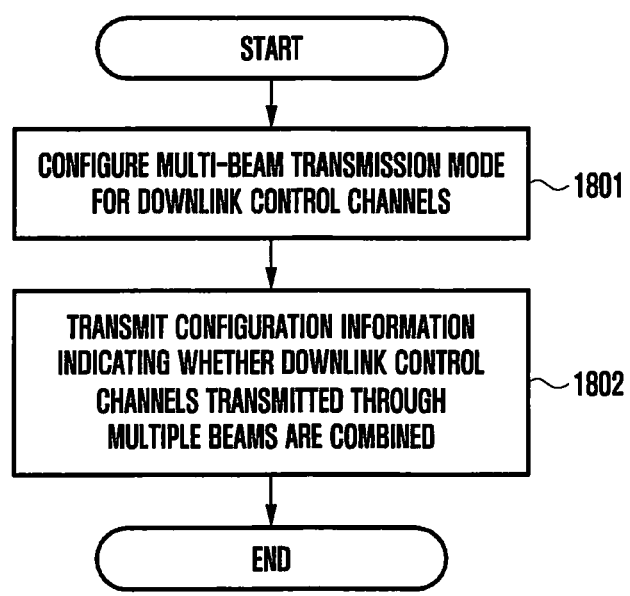
FIGS. 18A and 18B illustrate gNB and UE operations according to embodiment 6-1 of the disclosure.

FIG. 18A illustrates a gNB operation according to embodiment 6-1 of the disclosure. The gNB may configure a multi-beam transmission mode for downlink control channels in the UE in step 1801. The gNB may transmit configuration information indicating whether the downlink control channels transmitted through multiple beams are combined in step 1802.

Figure 18B:
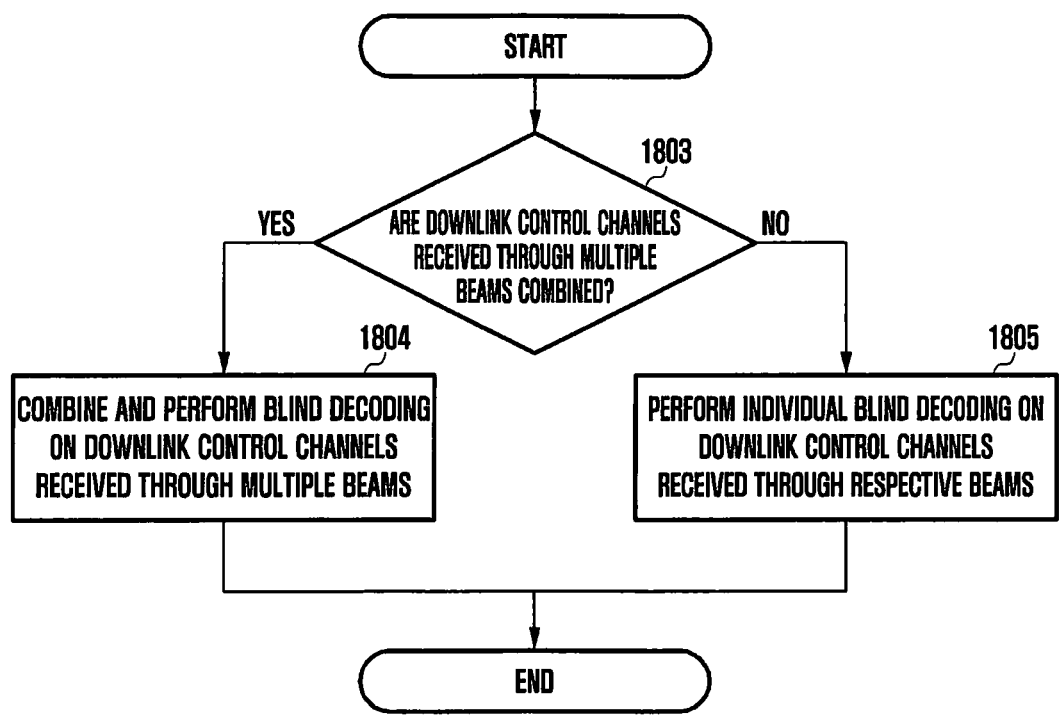

Meanwhile, FIG. 18B illustrates a UE operation according to embodiment 6-1 of the disclosure. The UE may determine whether to combine downlink control channels transmitted through multiple beams in step 1803. If it is configured to perform combining, the UE may perform blind decoding after combining the downlink control channels in step 1804. If it is configured not to perform combining, the UE may not combine the downlink control channels, but may perform individual blind decoding on the downlink control channels received through respective beams in step 1805.

Embodiment 6-2

In embodiment 6-2 of the disclosure, if the gNB and the UE transmit and receive downlink control channels through a plurality of beam pair links, the gNB may configure whether to combine the downlink control channels received by the UE through different beam links, and the transmission mode that is used may be implicitly known therefrom.

For example, if the UE receives a configuration indicating combining (combination) of the downlink control channels transmitted through a plurality of beam links from the gNB, the UE may implicitly know that at least one of the aforementioned [First transmission mode], [Second transmission mode], or [Fourth transmission mode] is applied to transmission of the corresponding downlink control channels. If the UE receives a configuration indicating not to combine the downlink control channels transmitted through a plurality of beam pair links from the gNB, the UE may implicitly know that the aforementioned [Second transmission made] is applied to transmission of the corresponding control channels.

Figure 19:
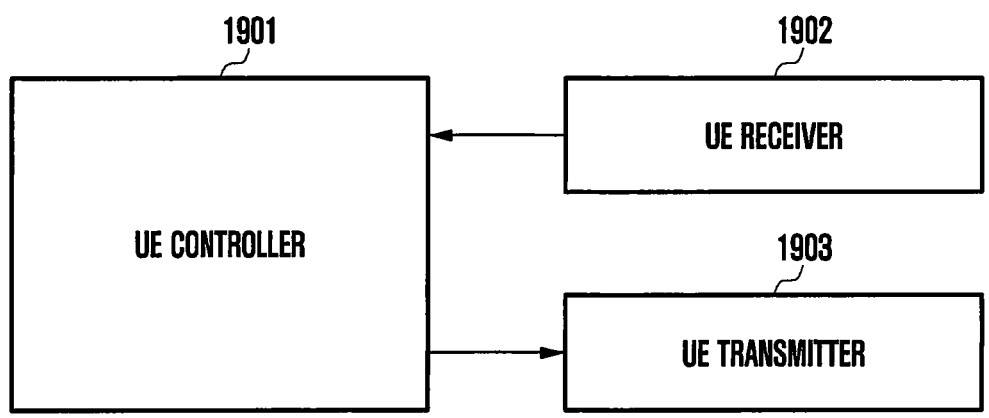
FIG. 19 is a block diagram illustrating the internal structure of a UE according to an embodiment of the disclosure.
Figure 20:
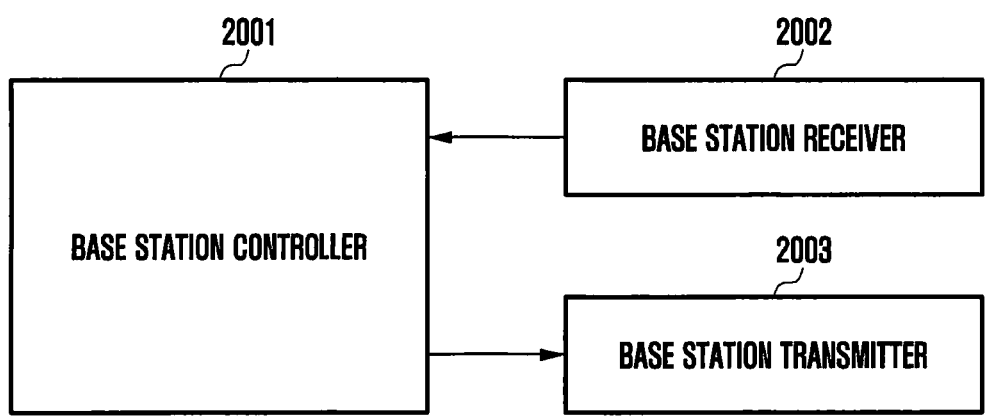
FIG. 20 is a block diagram illustrating the internal structure of a base station according to an embodiment of the disclosure.

A transmitter, a receiver, and a controller of each of the UE and the gNB are illustrated in FIGS. 19 and 20 to implement the embodiments of the disclosure. A method of transmitting multiple beams for downlink control channels, a method of configuring control regions for multiple beams, a method of transmitting DCI, and the structures of the gNB and the UE performing signaling therefor in the 5G communication system corresponding to the embodiments have been described, and the transmitter, the receiver, and the processor of each of the gNB and the UE are required to operate according to the embodiments in order to perform the same.

Specifically, FIG. 19 is a block diagram illustrating the structure of a UE according to an embodiment of the disclosure. As illustrated in FIG. 19, the UE according to the disclosure may include a UE controller 1901, a receiver 1902, and a transmitter 1903.

The UE controller 1901 may control a series of processes in which the UE may operate according to the above-described embodiments of the disclosure. For example, decoding operations for downlink control channels and data channels by the UE may be controlled differently according to information such as a method of configuring control regions for downlink control channels according to embodiments of the disclosure, a blind decoding operation for downlink control channels, and a beam recovery request operation for beam pair links. The UE receiver 1902 and the UE transmitter 1903 are together referred to as a transceiver in the embodiments of the disclosure. The transceiver may transmit and receive a signal to and from the gNB. The signal may include control information and data. To this end, the transceiver may include an RF transmitter that up-converts and amplifies the frequency of a transmitted signal, an RF receiver that low-noise amplifies a received signal and down-converts the frequency, and the like. Also, the transceiver may receive a signal through a radio channel, output the signal to the UE controller 1901, and transmit the signal output from the UE controller 1901 through the radio channel.

According to an embodiment of the disclosure, the controller 1901 may control the transceiver to receive CORESET configuration information including at least one piece of beam information corresponding to at least one CORESET and to receive downlink control information (DCI) in each of the at least one CORESET on the basis of the at least one piece of beam information included in the CORESET configuration information.

Further, if a plurality of pieces of beam information corresponding to a plurality of CORESETs are included in the CORESET configuration information, the controller 1901 may control the transceiver to repeatedly receive the DCI in the plurality of CORESETs through a plurality of beams formed on the basis of the plurality of pieces of beam information.

Meanwhile, the controller 1901 may control the transceiver to receive configuration information for a single-beam communication mode, to receive configuration information of the CORESET including information on a single beam, to receive configuration information for a multi-beam communication mode, and to receive CORESET configuration information for transmitting the DCI in each of the plurality of CORESETs on the basis of the information on the single beam according to the configured multi-beam communication mode.

At this time, the CORESET configuration information may be received through higher-layer signaling. The CORESET configuration information may include at least one piece of resource block allocation information on the frequency axis in which the CORESET is transmitted, control region duration on the time axis, resource mapping type information, transmission mode information, search space type information, monitoring-related information, and REG bundle size information.

FIG. 20 is a block diagram illustrating the internal structure of a base station according to an embodiment of the disclosure. As illustrated in FIG. 20, the base station according to the disclosure may include a base station controller 2001, a receiver 2002, and a transmitter 2003.

The base station controller 2001 may control a series of processes in which the base station may operate according to the above-described embodiments of the disclosure. For example, a series of processes may be controlled differently according to a method of transmitting multiple beams for downlink control channels, a method of configuring multiple beams, a method of configuring control regions, and a method of transmitting DCI. Further, a series of processes may be controlled to transmit various additional indicators as necessary. The base station receiver 2002 and the base station transmitter 2003 are together referred to as a transceiver in the embodiments of the disclosure. The transceiver may transmit and receive a signal to and from the UE. The signal may include control information and data. To this end, the transceiver may include an RF transmitter that up-converts and amplifies the frequency of a transmitted signal, an RF receiver that low-noise amplifies a received signal and down-converts the frequency, and the like. Also, the transceiver may receive a signal through a radio channel, output the signal to the base station controller 2001, and transmit the signal output from the base station controller 2001 through the radio channel.

According to an embodiment of the disclosure, the controller 2001 may control the transceiver to transmit CORESET configuration information including at least one piece of beam information corresponding to at least one CORESET and to transmit downlink control information (DCI) in each of the at least one CORESET on the basis of the at least one piece of beam information included in the CORESET configuration information.

Meanwhile, if a plurality of pieces of beam information corresponding to a plurality of CORESETs is included in the CORESET configuration information, the controller 2001 may control the transceiver to repeatedly transmit the DCI in each of the plurality of CORESETs through a plurality of beams formed on the basis of the plurality of pieces of beam information.

Further, the controller 2001 may control the transceiver to transmit configuration information for a single-beam communication mode, transmit CORESET configuration information including information on a single beam, transmit configuration information for the multi-beam transmission mode, and transmit the CORESET configuration information for transmitting the DCI in each of the plurality of CORESETs on the basis of the information on the single beam.

At this time, the CORESET configuration information may be transmitted through higher-layer signaling. The CORESET configuration information may include at least one piece of resource block allocation information on the frequency axis in which the CORESET is transmitted, control region duration on the time axis, resource mapping type information, transmission mode information, search space type information, monitoring-related information, and REG bundle size information.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

The invention claimed is:

1. A base station in a wireless communication system, the base station comprising:
a transceiver configured to transmit and receive a signal; and
a controller configured to:
select a transmission mode from a first transmission mode, a second transmission mode, and a third transmission mode, the transmission mode being for transmitting downlink control information (DCI) based on at least one beam pair,
control the transceiver to transmit transmission mode information for the selected transmission mode,
control the transceiver to transmit control resource set (CORESET) configuration information including at least one beam information corresponding to at least one respective CORESET, and
control the transceiver to transmit the DCI in each of the at least one CORESET based on the at least one beam information included in the CORESET configuration information according to the selected transmission mode,
wherein, in the first transmission mode, a same DCI is repeatedly transmitted for each beam pair, in case that each of a plurality of beam pairs is configured for a plurality of CORESETs,
wherein, in the second transmission mode, different DCIs are transmitted for each beam pair, in case that each of the plurality of beam pairs is configured for the plurality of CORESETs,
wherein, in the third transmission mode, a same DCI is repeatedly transmitted for each beam pair, in case that the plurality of beam pairs is configured for one CORESET, and
wherein the controller is further configured to, in case that different DCIs are transmitted for each beam pair, control the transceiver to transmit first DCI including first control information and a first indicator indicating whether second DCI is transmitted, based on a first beam pair, and to transmit second DCI including second control information and a second indicator indicating whether the first DCI is transmitted, based on a second beam pair.

2. The base station of claim 1, wherein, in case that a plurality of beam information corresponding to a plurality of CORESETs, respectively, is included in the CORESET configuration information, the controller controls the transceiver to repeatedly transmit the DCI in each of the plurality of CORESETs through a plurality of beams formed based on the plurality of beam information.

3. The base station of claim 1, wherein the controller controls the transceiver to transmit configuration information for a single-beam communication mode, transmit the CORESET configuration information including information on a single beam based on the configured single-beam communication mode, transmit configuration information for a multi-beam communication mode, and transmit the CORESET configuration information for transmitting the DCI in each of the plurality of CORESETs based on the information on the single beam according to the configured multi-beam communication mode.

4. The base station of claim 1, wherein the CORESET configuration information is transmitted through higher-layer signaling and includes at least one piece of frequency axis resource block allocation information for transmission of the CORESETs, a time axis control region duration, resource mapping type information, transmission mode information, search space type information, monitoring-related information, and REG bundle size information.

5. A method of controlling a base station in a wireless communication system, the method comprising:
selecting a transmission mode from a first transmission mode, a second transmission mode, and a third transmission mode, the transmission mode being for transmitting downlink control information (DCI) based on at least one beam pair;
transmitting transmission mode information for the selected transmission mode;
transmitting control resource set (CORESET) configuration information including at least one piece of beam information corresponding to at least one respective CORESET; and
transmitting the DCI in each of the at least one CORESET based on the at least one piece of beam information included in the CORESET configuration information according to the selected transmission mode,
wherein in the first transmission mode, a same DCI is repeatedly transmitted for each beam pair, in case that each of a plurality of beam pairs is configured for a plurality of CORESETs,
wherein, in the second transmission mode, different DCIs are transmitted for each beam pair, in case that each of the plurality of beam pairs is configured for the plurality of CORESETs,
wherein, in the third transmission mode, a same DCI is repeatedly transmitted for each beam pair, in case that the plurality of beam pairs is configured for one CORESET, and
wherein, in case that different DCIs are transmitted for each beam pair, the method further comprises:
transmitting first DCI including first control information and a first indicator indicating whether second DCI is transmitted, based on a first beam pair; and
transmitting second DCI including second control information and a second indicator indicating whether the first DCI is transmitted, based on a second beam pair.

6. The method of claim 5, wherein, in case that a plurality of beam information corresponding to a plurality of CORESETs, respectively, is included in the CORESET configuration information, the transmitting of the DCI comprises repeatedly transmitting the DCI in each of the plurality of CORESETs using a plurality of beams formed based on the plurality of pieces of beam information.

7. The method of claim 5, wherein the transmitting of the CORESET configuration information further comprises:
transmitting configuration information for a single-beam communication mode;
transmitting the CORESET configuration information including information on a single beam based on the configured single-beam communication mode;
transmitting configuration information for a multi-beam communication mode; and
transmitting the CORESET configuration information for transmitting the DCI in each of the plurality of CORESETs based on the information on the single beam according to the configured multi-beam communication mode.

8. The method of claim 5, wherein the CORESET configuration information is transmitted through higher-layer signaling and includes at least one piece of frequency axis resource block allocation information for transmission of the CORESETs, a time axis control region duration, resource mapping type information, transmission mode information, search space type information, monitoring-related information, and REG bundle size information.

9. A terminal in a wireless communication system, the terminal comprising;
- a transceiver configured to transmit and receive a signal; and
- a controller configured to receive, from a base station, transmission mode information for receiving downlink control information (DCI) based on a plurality of beam pairs, receive control resource set (CORESET) configuration information including at least one piece of beam information corresponding to at least one respective CORESET and receive the DCI in each of the at least one CORESET based on the at least one piece of beam information included in the CORESET configuration information according to a transmission mode,
- wherein the transmission mode is selected, by the base station, from a first transmission mode, a second transmission mode, and a third transmission mode, the transmission mode information is for the selected transmission mode,
- wherein, in the first transmission mode, a same DCI is repeatedly transmitted for each beam pair, in case that each of a plurality of beam pairs is configured for a plurality of CORESETs,
- wherein, in the second transmission mode, different DCIs are transmitted for each beam pair, in case that each of the plurality of beam pairs is configured for the plurality of CORESETs,
- wherein, in the third transmission mode, a same DCI is repeatedly transmitted for each beam pair, in case that the plurality of beam pairs is configured for one CORESET, and
- wherein the controller is further configured to, in case that different DCIs are transmitted for each beam pair, control the transceiver to receive first DCI including first control information and a first indicator indicating whether second DCI is transmitted, based on a first beam pair, and to receive second DCI including second control information and a second indicator indicating whether the first DCI is transmitted, based on a second beam pair.

10. The terminal of claim 9, wherein the controller is further configured to:
- identify the transmission mode as a transmission mode in which the DCI is repeatedly transmitted through a plurality of beams based on the information on the transmission mode,
- if a plurality of beam information corresponding to a plurality of CORESETs, respectively, is included in the CORESET configuration information, control the transceiver to repeatedly receive the DCI in each of the plurality of pieces of CORESETs through the plurality of beams formed based on the plurality of pieces of beam information, and
- combine the DCI which is repeatedly received and performing a blind decoding the combined DCI.

11. The terminal of claim 9, wherein the controller is further configured to: control the transceiver to receive configuration information for a single-beam communication mode, receive the CORESET configuration information including information on a single beam based on the configured single-beam communication mode, receive configuration information for a multi-beam communication mode, and receive the CORESET configuration information for transmitting the DCI in each of the plurality of CORESETs based on the information on the single beam according to the configured multi-beam communication mode.

12. The terminal of claim 9, wherein the CORESET configuration information is transmitted through higher-layer signaling and includes at least one piece of frequency axis resource block allocation information for transmission of the CORESETs, a time axis control region duration, resource mapping type information, transmission mode information, search space type information, monitoring-related information, and REG bundle size information.

13. A method of controlling a terminal in a wireless communication system, the method comprising:
- receiving, from a base station, transmission mode information for receiving downlink control information (DCI) based on a plurality of beam pairs;
- receiving control resource set (CORESET) configuration information including at least one piece of beam information corresponding to at least one respective CORESET; and
- receiving the DCI in each of the at least one CORESET based on the at least one piece of beam information included in the CORESET configuration information according to a transmission mode, wherein the transmission mode is selected, by the base station, from a first transmission mode, a second transmission mode, and a third transmission mode, the transmission mode information is for the selected transmission mode,
- wherein in the first transmission mode, a same DCI is repeatedly transmitted for each beam pair, in case that each of a plurality of beam pairs is configured for a plurality of CORESETs,
- wherein, in the second transmission mode, different DCIs are transmitted for each beam pair, in case that each of the plurality of beam pairs is configured for the plurality of CORESETs,
- wherein, in the third transmission mode, a same DCI is repeatedly transmitted for each beam pair, in case that the plurality of beam pairs is configured for one CORESET, and
- wherein, in case that different DCIs are transmitted for each beam pair, the method further comprises:
  - receiving first DCI including first control information and a first indicator indicating whether second DCI is transmitted, based on a first beam pair; and
  - receiving second DCI including second control information and a second indicator indicating whether the first DCI is transmitted, based on a second beam pair.

14. The method of claim 13, wherein the receiving of the DCI further comprises:
- identifying the transmission mode as a transmission mode in which the DCI is repeatedly transmitted through a plurality of beams based on the information on the transmission mode;
- if a plurality of beam information corresponding to a plurality of CORESETs, respectively, is included in the CORESET configuration information, repeatedly receiving the DCI in each of the plurality of pieces of CORESETs through the plurality of beams formed based on the plurality of pieces of beam information; and
- combining the DCI which is repeatedly received and performing a blind decoding the combined DCI.

15. The method of claim 13, wherein the receiving of the CORESET configuration information comprises:
- receiving configuration information for a single-beam communication mode;
- receiving the CORESET configuration information including information on a single beam based on the configured single-beam communication mode;
- receiving configuration information for a multi-beam communication mode; and
- receiving the CORESET configuration information for transmitting the DCI in each of the plurality of CORESETs based on the information on the single beam according to the configured multi-beam communication mode.

* * * * *